(12) United States Patent
Natanzon et al.

(10) Patent No.: US 8,271,447 B1
(45) Date of Patent: Sep. 18, 2012

(54) MIRRORING METADATA IN A CONTINUOUS DATA PROTECTION ENVIRONMENT

(75) Inventors: Assaf Natanzon, Ramat-Gan (IL); Saar Cohen, Moshav Mishmeret (IL); Sharon Vitek, Tel Aviv (IL); Ariel Kulik, Rehovot (IL)

(73) Assignee: EMC International Company, Hamilton (BM)

( * ) Notice: Subject to any disclaimer, the term of this patent is extended or adjusted under 35 U.S.C. 154(b) by 158 days.

(21) Appl. No.: 12/818,236

(22) Filed: Jun. 18, 2010

(51) Int. Cl.
*G06F 7/00* (2006.01)
*G06F 17/30* (2006.01)

(52) U.S. Cl. ........................ 707/660; 707/655
(58) Field of Classification Search .................. None
See application file for complete search history.

(56) References Cited

U.S. PATENT DOCUMENTS

| | | | | |
|---|---|---|---|---|
| 5,638,509 A * | 6/1997 | Dunphy et al. | ................. | 714/20 |
| 5,799,141 A * | 8/1998 | Galipeau et al. | ................. | 714/13 |
| 6,732,125 B1 * | 5/2004 | Autrey et al. | ................. | 707/640 |
| 6,839,819 B2 * | 1/2005 | Martin | ........................... | 711/162 |
| 6,889,228 B1 * | 5/2005 | Federwisch | ........................... | 1/1 |
| 7,096,331 B1 * | 8/2006 | Haase et al. | ................. | 711/162 |
| 7,552,358 B1 * | 6/2009 | Asgar-Deen et al. | .......... | 714/6.1 |
| 7,827,366 B1 * | 11/2010 | Nadathur et al. | ............. | 711/162 |
| 7,831,639 B1 * | 11/2010 | Panchbudhe et al. | ......... | 707/816 |
| 7,860,836 B1 * | 12/2010 | Natanzon et al. | ............. | 707/648 |
| 7,996,718 B1 * | 8/2011 | Ou et al. | ......................... | 714/23 |
| 2002/0056031 A1 * | 5/2002 | Skiba et al. | ................... | 711/162 |
| 2002/0133714 A1 * | 9/2002 | Sales et al. | .................... | 713/200 |
| 2005/0039069 A1 * | 2/2005 | Prahlad et al. | .................... | 714/2 |
| 2005/0182910 A1 * | 8/2005 | Stager et al. | .................. | 711/162 |
| 2005/0193272 A1 * | 9/2005 | Stager et al. | ..................... | 714/42 |
| 2007/0022264 A1 * | 1/2007 | Bromling et al. | ............. | 711/162 |
| 2007/0088975 A1 * | 4/2007 | Ashmore et al. | .................. | 714/6 |
| 2007/0130214 A1 * | 6/2007 | Boyd et al. | .................... | 707/200 |
| 2007/0143096 A1 * | 6/2007 | Brunet et al. | ................... | 703/23 |
| 2007/0156793 A1 * | 7/2007 | D'Souza et al. | ............. | 707/204 |
| 2007/0220309 A1 * | 9/2007 | Andre et al. | ...................... | 714/6 |
| 2007/0245107 A1 * | 10/2007 | Kano | ............................ | 711/163 |
| 2007/0266053 A1 * | 11/2007 | Ahal et al. | .................... | 707/200 |
| 2007/0300033 A1 * | 12/2007 | Kano | ............................ | 711/170 |
| 2008/0082591 A1 * | 4/2008 | Ahal et al. | .................... | 707/204 |
| 2010/0235326 A1 * | 9/2010 | Fashchik et al. | .............. | 707/656 |

* cited by examiner

*Primary Examiner* — Pierre Vital
*Assistant Examiner* — Augustine K Obisesan
(74) *Attorney, Agent, or Firm* — Daly, Crowley, Mofford & Durkee, LLP

(57) ABSTRACT

In one aspect, a method includes providing data protection to data in a first volume at a first data protection appliance by storing a copy of the data in a second volume using a second data protection appliance, tracking changes between data locations in the first volume and the second volume using a delta marking stream (DMS) and receiving, at the first data protection appliance, metadata. The metadata is intended to be committed to the DMS. The method further includes mirroring the metadata at a third data protection appliance.

11 Claims, 28 Drawing Sheets

JOURNAL VOLUME SEGMENTS AT STAGE 1

| BLOCK NO. | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| SEGMENT #1 | ID=1: 1 BLOCK OF DO METADATA | ID=2: 1 BLOCK OF DO METADATA | ID=3: 1 BLOCK OF DO METADATA | ID=1: 15 BLOCKS OF DO DATA | | | | | | | | | | | | ID=2: 5 BLOCKS OF DO DATA | | | | |
| SEGMENT #2 | | | | ID=2: 15 BLOCKS OF DO DATA | | | | | | | | | | | | ID=3: 5 BLOCKS OF DO DATA | | | | |
| SEGMENT #3 | | | | ID=3: 15 BLOCKS OF DO DATA | | | | | | | | | | | | | | | | |
| SEGMENT #4 | | | | | | | | | | | | | | | | | | | | |

THE FOUR STREAMS

DO STREAM INCLUDES SEGMENTS #1, #3 AND #4, BEGINS AT SEGMENT #1, BLOCK #0 AND ENDS AT SEGMENT #4, BLOCK #15
DO METADATA STREAM INCLUDES SEGMENT #2, BEGINS AT SEGMENT #2, BLOCK #0 AND ENDS AT SEGMENT #2, BLOCK #3
UBDO STREAM IS EMPTY
UNDO METADATA STREAM IS EMPTY

*FIG. 3A*

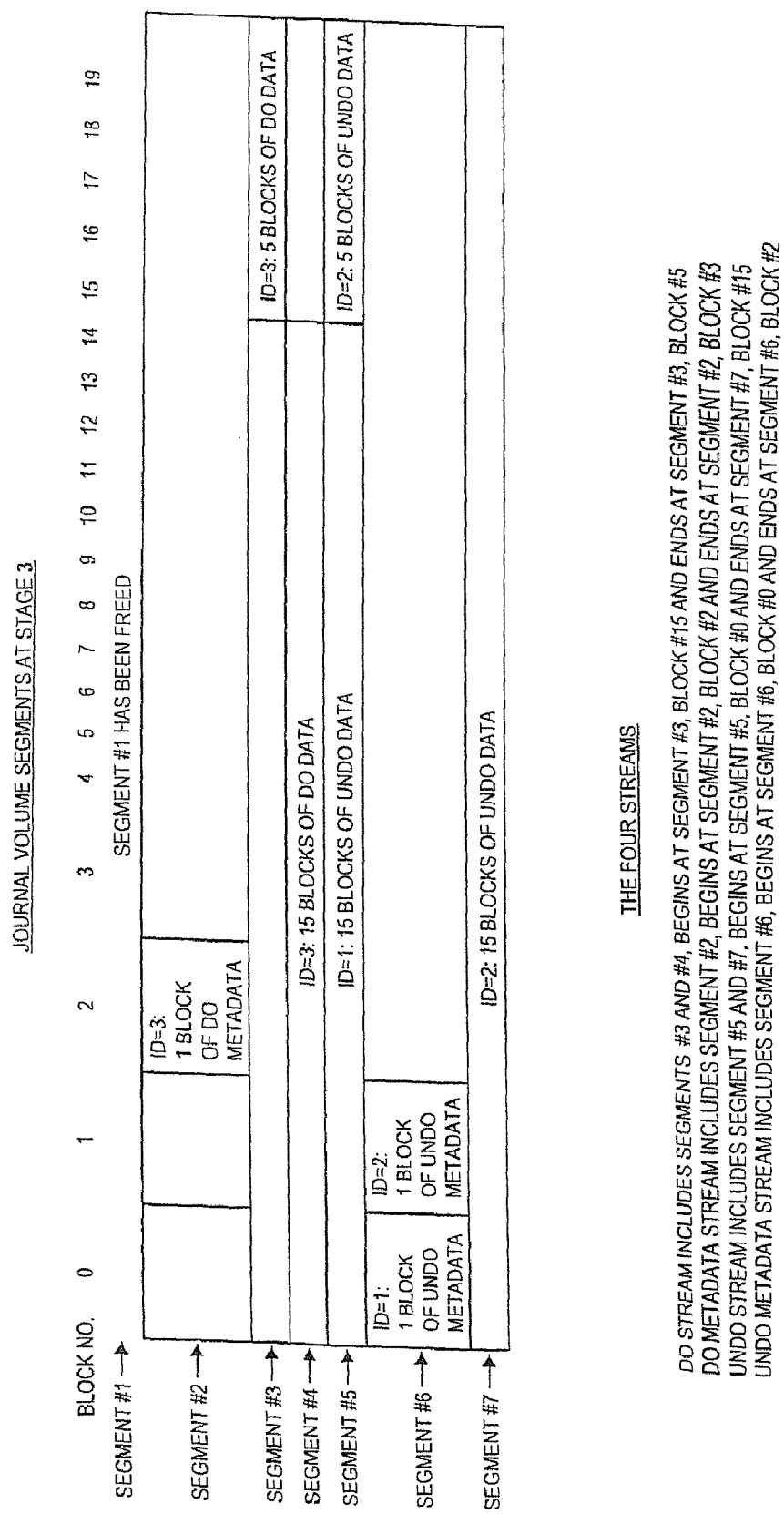

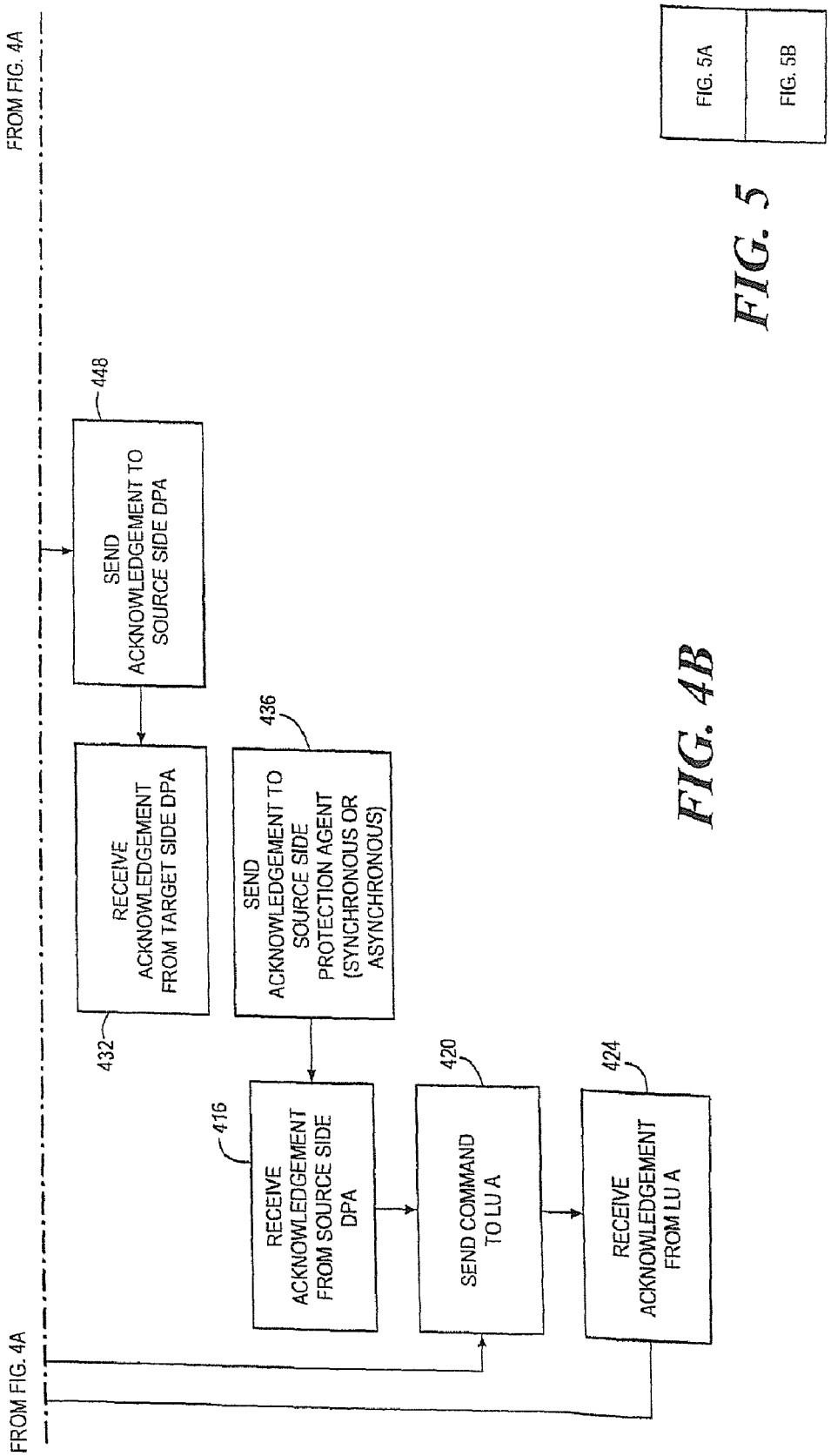

MIRRORING METADATA IN A CONTINUOUS DATA PROTECTION ENVIRONMENT

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

CDP systems generally include an initialization process when synchronizing first and second volumes. While it is desirable to compare data signatures instead of actual data as much as possible for greater efficiency, there are times when signature comparison could be used but is not available in conventional CDP systems.

SUMMARY

In one aspect, a method includes providing data protection to data in a first volume at a first data protection appliance by storing a copy of the data in a second volume using a second data protection appliance, tracking changes between data locations in the first volume and the second volume using a delta marking stream (DMS) and receiving, at the first data protection appliance, metadata. The metadata is intended to be committed to the DMS. The method further includes mirroring the metadata at a third data protection appliance.

In another aspect, an article includes a non-transitory machine-readable medium that stores executable instructions to perform mirroring. The instructions cause a machine to provide data protection to data in a first volume at a first data protection appliance by storing a copy of the data in a second volume using second data protection appliance, track changes between data locations in the first volume and the second volume using a delta marking stream (DMS) and receive, at the first data protection appliance, metadata. The metadata intended to be committed to the DMS. The instructions also cause the machine to mirror the metadata at a third data protection appliance.

In a further aspect, an apparatus to perform mirroring includes circuitry to provide data protection to data in a first volume at a first data protection appliance by storing a copy of the data in a second volume, track changes between data locations in the first volume and the second volume using a delta marking stream (DMS) and receive, at the first data protection appliance, metadata. The metadata intended to be committed to the DMS. The apparatus also includes circuitry to mirror the metadata at a third data protection appliance.

One or more of the aspects above may include one or more of the following features. The second data protection appliance is the first data protection appliance. Mirroring the metadata at the third data protection appliance includes mirroring the metadata at a third data protection appliance in a same cluster as the first data protection appliance. Committing the metadata to the DMS and removing the metadata from the third data protection appliance if the metadata is committed to the DMS. Mirroring includes storing the metadata at the third data protection appliance until at least one of a predefined amount of time has elapsed or the metadata reaches a predefined size. Storing the metadata at the third data protection appliance includes storing the metadata using a basket system. Receiving a request to recover the metadata and acquiring the metadata at the third data protection appliance. Determining if the acquiring of the metadata is successful, moving the metadata to the DMS if acquiring the metadata is successful moving the system to stable mode and performing a full sweep on the first and second volumes if acquiring the metadata is not successful. Receiving a request to recover the metadata and performing a full sweep on the first and second volumes comprises performing a full sweep on the first and second volumes if in a fragile mode. If mirroring fails: moving into a fragile mode if the fragile mode is allowed and moving into a stable mode if the fragile mode is not allowed. Establishing a connection between the first data protection appliance and the second data protection appliance, connecting a protection agent to the first data protection appliance if the connection between the first data protection appliance and the second data protection appliance has been established and sending I/Os from the protection agent to the first data protection appliance.

BRIEF DESCRIPTION OF THE DRAWINGS

FIG. 3A is a simplified illustration of a first stage of a journal and four data streams stored therein, after recording three write transactions.

FIG. 3C is a simplified illustration of a third stage of a journal history and four data streams stored therein, after applying a second write transactions to a storage system.

DETAILED DESCRIPTION

Figure 1:
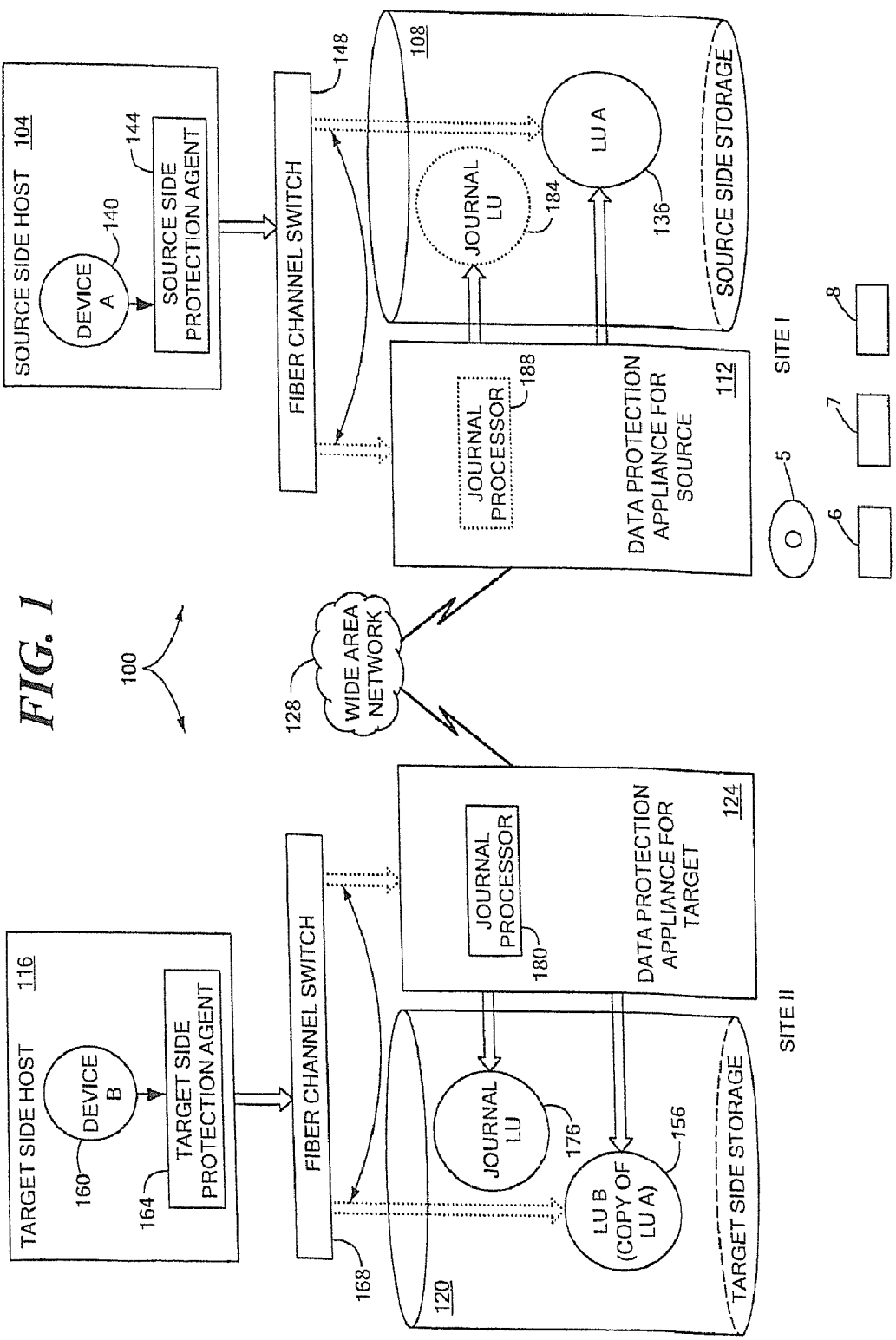
FIG. 1 is a simplified block diagram of a data protection system.

The following definitions are employed throughout the specification and claims.

BACKUP SITE—a facility where replicated production site data is stored; the backup site may be located in a remote site or at the same location as the production site;

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

The methods and apparatus of exemplary embodiments may take the form, at least partially, of program code (i.e., instructions) embodied in tangible media, such as disks (element 5 in FIG. 1), CD-ROMs 6, hard drives 7, random access or read only-memory 8, or any other machine-readable storage medium, including transmission medium. When the program code is loaded into and executed by a machine, such as a computer, the machine becomes an apparatus for practicing the embodiments described herein. The media can include portions in different system components, such as memory in a host, an application instance, and or, a management station. The methods and apparatus may be embodied in the form of program code that may be implemented such that when the program code is received and loaded into and executed by a machine, such as a computer, the machine becomes an apparatus for practicing the embodiments described herein. When implemented on processor, the program code combines with the processor to provide a unique apparatus that operates analogously to specific logic circuits. The program code (software-based logic) for carrying out the method is embodied as part of the system described below.

Reference is now made to FIG. 1, which is a simplified illustration of a data protection system 100. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point in time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as small computer system interface (SCSI) commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In one example, storage system 108 exposes a logical unit 136, designated as LU A, and storage system 120 exposes a logical unit 156, designated as LU B.

In one example, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in some examples, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In one example, host device 104 identifies LU A and generates a corresponding host device 140, designated as Device A, through which it can access LU A. Similarly, host computer 116 identifies LU B and generates a corresponding device 160, designated as Device B.

In one example, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In one example, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In on example, host computer 104 and host computer 116 include protection agents 144 and 164, respectively. Protection agents 144 and 164 intercept SCSI commands issued by their respective host computers, via host devices to logical units that are accessible to the host computers. In other examples, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In one example, protection agents communicate with their respective DPAs by sending SCSI commands over fiber channel.

In one example, protection agents 144 and 164 are drivers located in their respective host computers 104 and 116. Alternatively, a protection agent may also be located in a fiber channel switch, inside the storage system or in any other device situated in a data path between a host computer and a storage system.

What follows is a detailed description of system behavior under normal production mode, and under recovery mode.

In one example, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in one example, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In one example, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
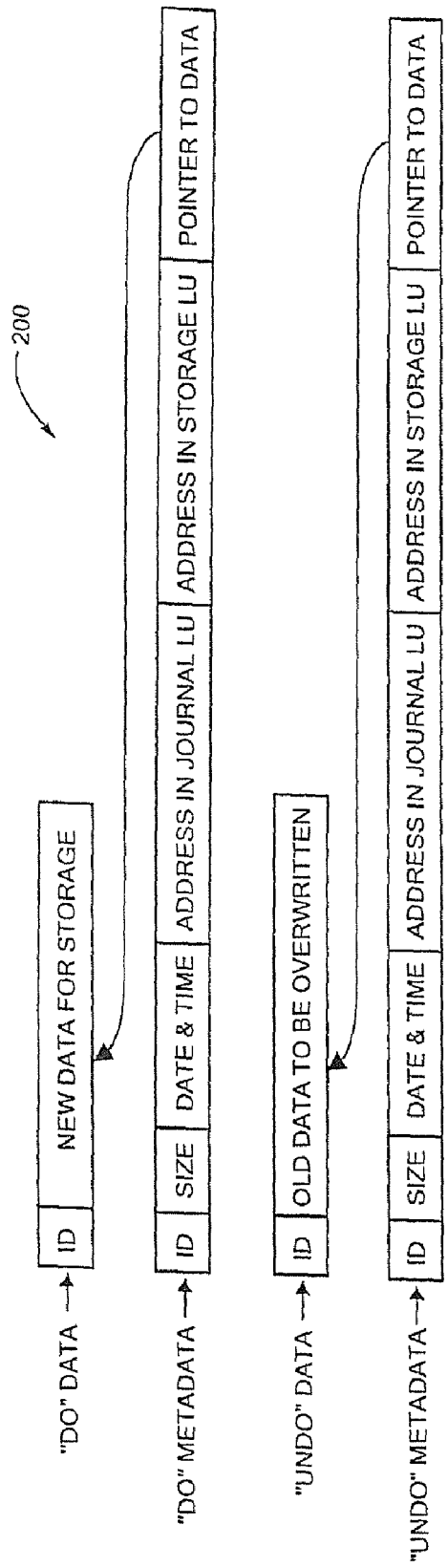
FIG. 2 is a simplified illustration of a journal history of write transactions for a storage system.

Reference is now made to FIG. 2, which is a simplified illustration of a write transaction 200 for a journal. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as indicated in TABLE I below.

TABLE I

Entering a write transaction in the journal

| | |
|---|---|
| Step 1 | The new data is written at the end of the DO stream, assuming a forward write direction, and corresponding metadata is written at the end of the DO METADATA stream. |
| Step 2 | Data is read from the beginning of the DO stream, and corresponding metadata is read from the beginning of the DO METADATA stream. |
| Step 3 | Old data to be overwritten is read from LU B. The location and size of such old data is determined from the DO METADATA stream. |
| Step 4 | The old data is written at the end of the UNDO stream, and corresponding metadata is written at the end of the UNDO METADATA stream. |
| Step 5 | The new data read at Step 2 is written into LU B, and the beginning and end pointers of the DO and DO METADATA streams are moved appropriately. |

Conversely, during a rollback to undo a write transaction, the above operations are reversed, as indicated in TABLE II below.

TABLE II

Undoing a write transaction in the journal

| | |
|---|---|
| Step 1 | Read the data and metadata from the end of the UNDO and UNDO METADATA streams. |
| Step 2 | Read from LU B the data that is to be overwritten. The location and size of such data is determined from the UNDO METADATA stream. |
| Step 3 | Write the data from Step 2 at the beginning of the DO stream, and update the DO METADATA stream accordingly. |
| Step 4 | Write the data from Step 1 to LU B, and update the beginning and end pointers of the UNDO and UNDO metadata streams appropriately. |

The following example, in conjunction with FIGS. 3A-3D, describes specific details of the journaling process. A journal volume includes a plurality of segments from a segment pool, each segment including 20 data blocks.

Three write transactions are received, as indicated in TABLE III.

TABLE III

Example Write Transactions

| Write ID | Time | LU B location | Length | Journal LU location |
|---|---|---|---|---|
| 1 | 12/03/05 10:00:00.00 | LU B offset 57 blocks | 15 blocks | Segment 1, offset 0 |
| 2 | 12/03/05 10:00:00.05 | LU B offset 87 blocks | 20 blocks | Segment 1, offset 15 |
| 3 | 12/03/05 10:00:00.18 | LU B offset 12 blocks | 20 blocks | Segment 3, Offset 15 |

The following discussion describes four stages of journaling and data storage; namely, Stage #1: Enter the three write transactions as journal entries in the journal LU.
Stage #2: Apply the first write transaction to LU B.
Stage #3: Apply the second write transaction to LU B.
Stage #4: Rollback the second write transaction, to recover data from an earlier point in time.

The write transaction with ID=1 is written to the first 15 blocks of Segment #1. The metadata corresponding to this transaction is written to the first block of Segment #2. The second write transaction with ID=2 is written to the last 5 blocks of Segment #1 and the first 15 blocks of Segment #3. The metadata corresponding to this transaction is written to the second block of Segment #2. The third write transaction with ID=3 is written to the last 5 blocks of Segment #3 and the first 15 blocks of Segment #4. The metadata corresponding to this transaction is written to the third block of Segment #2.

Thus at stage #1, the DO stream in memory includes a list of segments 1, 3, 4; and a beginning pointer to offset=0 in Segment #1 and an end pointer to offset=10 in Segment #4. The DO METADATA stream in memory includes a list of one segment, namely Segment #2; and a beginning pointer to offset=0 in Segment #2 and an end pointer to offset=3 in Segment #2. The UNDO stream and the UNDO METADATA stream are empty. The journal and the four streams at the end of stage #1 are illustrated in FIG. 3A.

At stage #2 the write transaction with ID=1 is applied to LU B. New data to be written is read from the journal LU at the offset and length indicated in the DO METADATA; namely, 15 blocks of data located in blocks 0-14 of journal volume Segment #1. Correspondingly, old data is read from LU B at the offset and length indicated in the UNDO METADATA; namely, 15 blocks of data located in blocks 57-71 of LU B. The old data is then written into the UNDO stream in the journal LU, and the associated metadata is written into the UNDO METADATA stream in the journal LU. Specifically, for this example, the UNDO data is written into the first 15 blocks of Segment #5, and the UNDO METADATA is written into the first block of Segment #6. The beginning pointer of the UNDO data stream is set to offset=0 in Segment #5, and the end pointer is set to offset=15 in Segment #5. Similarly, the beginning pointer of the UNDO METADATA stream is set to offset=0 on Segment #6, and the end pointer is set to offset=1 in Segment #6.

Figure 3B:
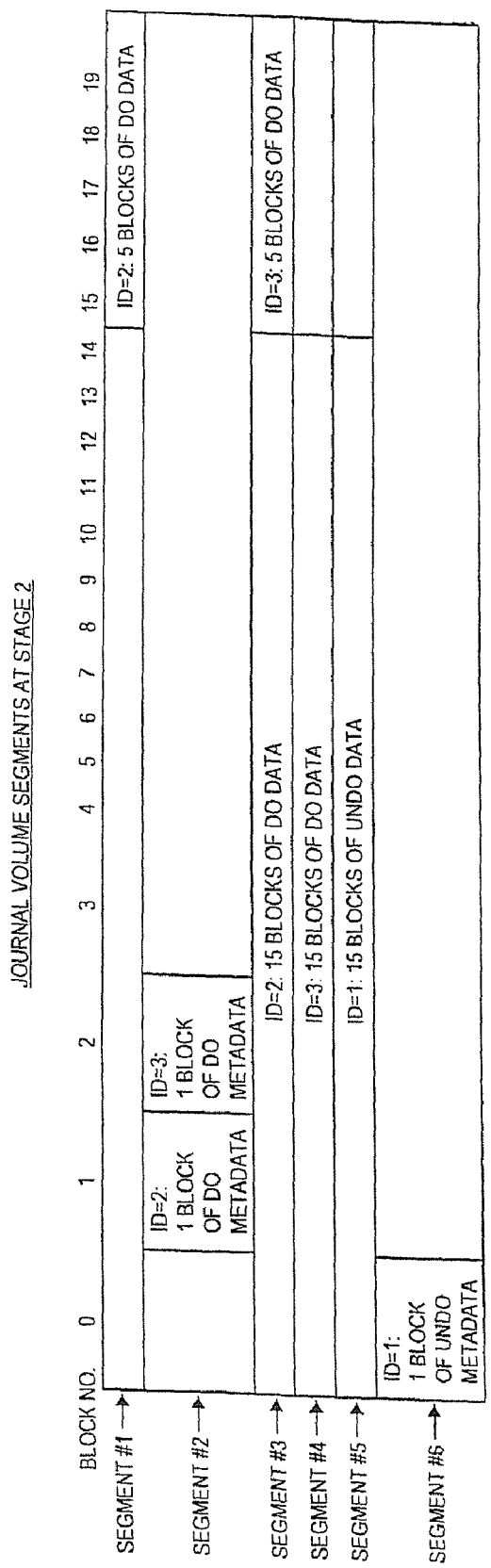
FIG. 3B is a simplified illustration of a second stage of a journal and four data streams stored therein, after applying a first write transactions to a storage system.

At this point, the new data that was read from blocks 0-14 of journal LU Segment #1 is written to blocks 57-71 of LU B. The beginning pointer for the DO stream is moved forward to block 15 of journal LU Segment #1, and the beginning pointer for the DO METADATA stream is moved forward to block 1 of journal LU Segment #2. The journal and the four streams at the end of stage #2 are illustrated in FIG. 3B.

At stage #3 the write transaction with ID=2 is applied to the storage system. As above, 20 blocks of new data are read from blocks 15-19 of journal LU Segment #1 and from blocks 0-14 of journal LU Segment #3. Similarly, 20 blocks of old data are read from blocks 87-106 of LU B. The old data is written to the UNDO stream in the last 5 blocks of journal LU Segment #5 and the first 15 blocks of journal LU Segment #7. The associated metadata is written to the UNDO METADATA stream in the second block of Segment #6. The list of segments in the UNDO stream includes Segment #5 and Segment #7. The end pointer of the UNDO stream is moved to block 15 of Segment #7, and the end pointed of the UNDO METADATA stream is moved to block 2 of Segment #6.

Finally, the new data from blocks 15-19 of journal LU Segment #1 and blocks 0-14 of journal LU Segment #3 is written into blocks 87-106 of LU B. The beginning pointer for the DO stream is moved forward to block 15 of journal volume Segment #3, and the beginning pointer for the DO METADATA stream is moved forward to block 2 of journal LU Segment #2. Segment #1 is freed from the DO stream, for recycling within the segment pool, and the list of segments for the DO stream is changed to Segment #3 and Segment #4. The journal and the four streams at the end of stage #3 are illustrated in FIG. 3C.

At stage #4 a rollback to time 10:00:00.00 is performed. Since the write transaction with ID=3 was not applied yet, the only write transaction to be undone is the write transaction with ID=2. The last entry is read from the UNDO METADATA stream, the location of the end of the UNDO METADATA stream being determined by its end pointer, i.e., the metadata before block 2 of journal LU Segment #6 is read, indicating two areas each of 20 blocks; namely, (a) the last 5 blocks of journal LU Segment #5 and the first 15 blocks of journal LU Segment #7, and (b) blocks 87-106 of LU B. Area (a) is part of the UNDO stream.

The 20 blocks of data from area (b) are read from LU B and written to the beginning of the DO stream. As the beginning pointer of the DO stream is set to offset=15 of journal LU Segment #3, 5 blocks are written at the end of Segment #3, and the remaining 15 blocks are written to Segment #8. The end pointer for the DO stream is set to block 15 of Segment #8. The list of segments for the DO stream is changed to Segment #3, Segment #4 and Segment #8. The metadata associated with the 20 blocks from area (b) is written to block 3 of Segment #2, and the end pointer of the DO METADATA stream is advanced to block 4 of Segment #2.

Figure 3D:
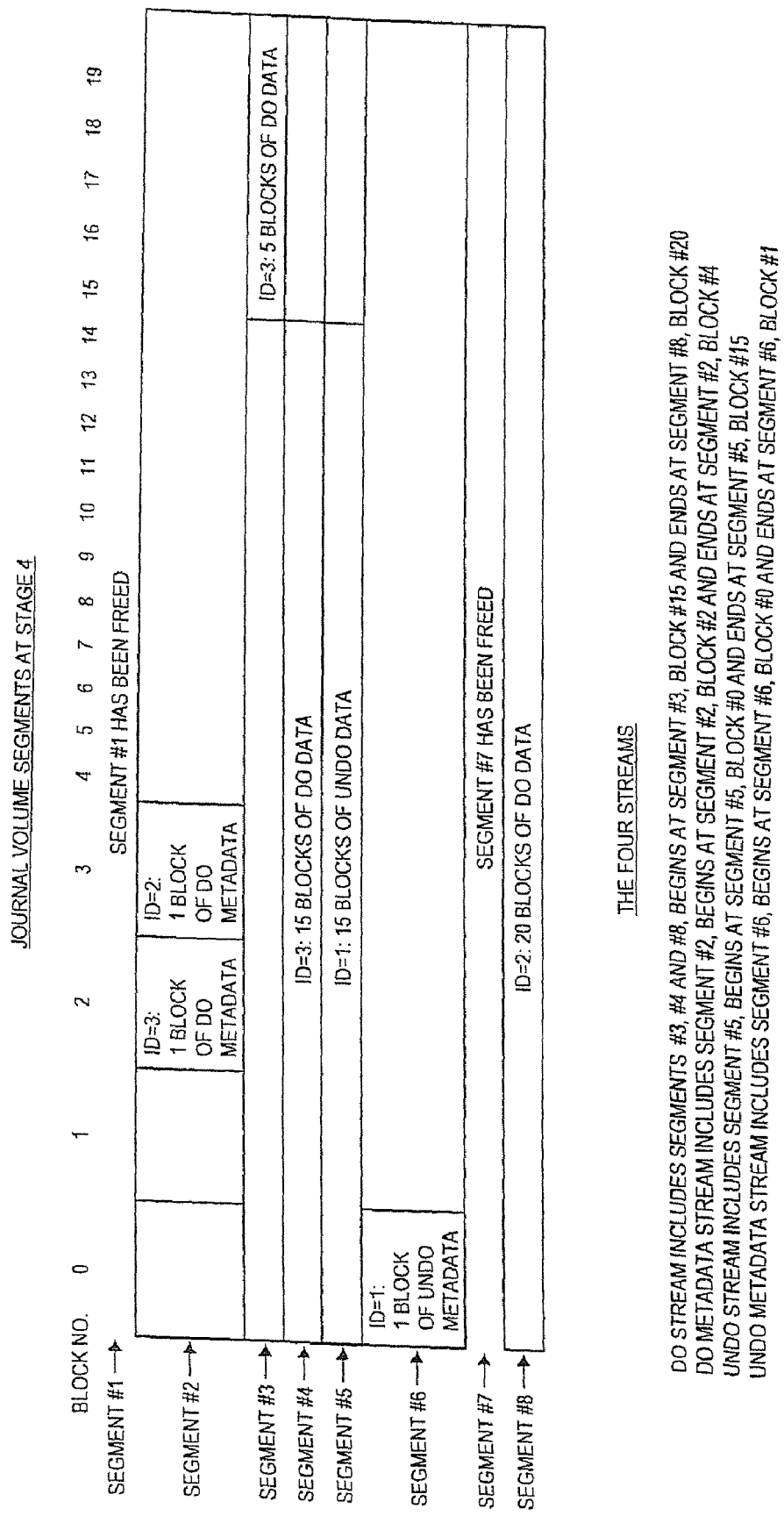
FIG. 3D is a simplified illustration of a fourth stage of a journal history and four data streams stored therein, after rolling back a write transaction.

The 20 blocks of data in area (a) of the journal LU are then written to area (b) of the LU B. Finally, Segment #7 is freed for recycling in the segment pool, the UNDO stream ending pointer is moved back to Segment #5 of the journal LU, block 15, and the UNDO METADATA stream ending pointed is moved back to Segment #6 of the journal LU, block 1. The journal and the four streams at the end of stage #4 are illustrated in FIG. 3D.

Thus it may be appreciated that the journal is thus used to rollback LU B to the state that it was in at a previous point in time. The journal is also used to selectively access data from LU B at such previous point in time, without necessarily performing a rollback. Selective access is useful for correcting one or more files that are currently corrupt, or for simply accessing old data.

Figure 4:
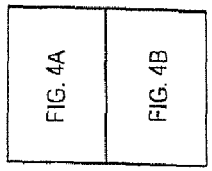
FIGS. 4A and 4B are a simplified flowchart of a data protection method during a normal production mode.

TABLE IV below summarizes the behavior of the special protection components of system 100 during production mode. Reference is also made to FIG. 4, which is a simplified flowchart of a data protection method corresponding to TABLE IV. FIG. 4 is divided into four columns. The leftmost column indicates steps performed by source side protection agent 112, the middle left column indicates steps performed by source side DPA 144, the middle right column indicates steps performed by target side DPA 124, and the rightmost column indicates steps performed by target side protection agent 164.

TABLE IV

Normal Production Mode Functionality

| System Component | Behavior |
| --- | --- |
| Source Side Agent 144 | Intercept SCSI commands issued to LU A by source side host via Device A (step 404). Replicate write commands, and route write commands to DPA (steps 408 and 412). Wait for first acknowledgement, from DPA (step 416), and then route replicate I/O command to LU A (step 420). Wait for second acknowledgement, from storage system (step 424), and then process next intercepted SCSI command (step 404). |
| Source Side DPA 112 | Receive write command from agent (step 428). Format write command as write transaction, and send to target DPA (step 428). In synchronous mode, wait for acknowledgement from target DPA (step 432), and then send acknowledgement to agent (step 436). In asynchronous mode and in snapshot mode, send acknowledgement to agent without waiting for acknowledgement from target DPA (step 436). |

TABLE IV-continued

Normal Production Mode Functionality

| System Component | Behavior |
|---|---|
| Target Side DPA 124 | Receive write transaction from source DPA (step 444). Enter write transaction in journal DO and DO METADATA streams (step 444), and send back acknowledgement to source DPA (step 448). Process journal entries by applying them to LU B, and enter undo information in UNDO and UNDO METADATA streams (step 440). |
| Target Side Agent 164 | Fail SCSI commands issued to LU B (step 452). |

Figure 4A:
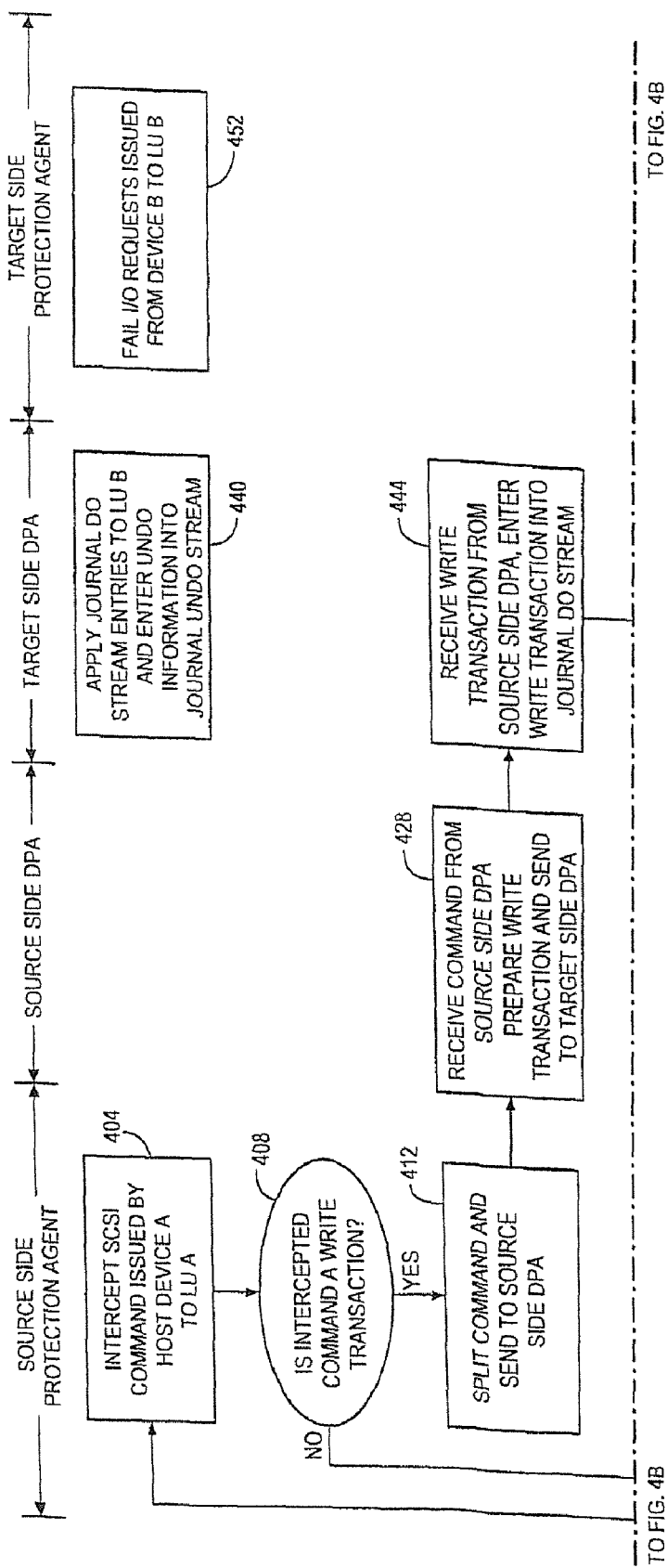

Only steps with arrows connecting them in FIGS. 4A and 4B are necessarily sequential. Thus steps 432 and 436, which do not have arrows connecting them, are not necessarily sequential. In synchronous mode these steps are sequential, but in asynchronous mode and in snapshot mode they are not sequential. In particular, DPA 112 may send an acknowledgement to protection agent 144 before receiving an acknowledgement back from DPA 124.

It is also noted in FIGS. 4A and 4B that the steps performed by target side DPA 124 include two non-sequential groups; namely, (i) step 440, and (ii) steps 444 and 448.

Recovery mode is generally triggered as a result of a disaster at the source side. The source side data may become corrupt, or may not exist at all. In such case, after recovery is completed at the backup site, a user may perform a failover operation by switching the roles of the production site and backup site. The original backup site becomes a current production site, and the original production site becomes a current backup site. Alternatively, recovery mode can be triggered without a failover, in order to access data from a previous point in time.

While in recovery mode, target site DPA 124 continues to receive new write transactions from DPA 112 and enter them at the ends of the DO and DO METADATA streams. However, unlike production mode behavior, DPA 124 stops applying journal entries received from DPA 112 to LU B. Instead, DPA 124 uses the UNDO stream of the journal to rollback LU B, as described hereinabove.

During recovery, after or possibly before rollback of LU B is complete, a user may wish to access data from the target site. To this end, protection agent 164 stops failing I/O requests issued by host computer 160 and begins redirecting them to DPA 124. The processing of data by host computer 160 during recovery mode is referred to as "target side processing (TSP)".

To manage TSP write commands that are received by target side DPA 124, journal processor 180 uses two additional data streams, referred to as TSP DO and TSP METADATA streams. When a TSP write command is received by DPA 124, it is entered at the end of the TSP DO stream and the end of the TSP DO METADATA stream. Since TSP writes relate to the state of LU B after the rollback is complete, the TSP DO stream writes are only applied to LU B after rollback is complete. Journal processor 180 applies TSP writes to LU B in a way similar to the way it applies write transactions deceiver from DPA 112; namely, journal processor 180 maintains the undo information for each write applied to LU B, in TSP UNDO and TSP UNDO METADATA streams.

When TSP read commands are received by target site DPA 124, DPA 124 returns the data to be read by identifying locations of the read command, and finding the most recent TSP write command or commands that were applied at these locations. The data is searched for (i) first in the TSP DO stream, and (ii) then in the journal UNDO data that was not yet applied to LU B and (iii) finally, if the data was not found in (i) and (ii), then the data is taken from LU B itself. In order to perform such a search efficiently, DPA 124 generates and stores in its memory a virtual image of the UNDO METADATA storage locations by using an efficient data structure, such as a binary search tree.

After rollback is completed, the TSP writes that were performed during the rollback are applied to LU B, and DPA 124 begins applying TSP writes synchronously; i.e., TSP writes are applied to LU B when they are received by DPA 124, without keeping them in the TSP DO stream. As such, when a read command is received after rollback is complete, it is sent directly to LU B instead of being redirected through DPA 124.

TABLES V and VI below summarize the behavior of the special protection components of system 100 during recovery mode, before and after the rollback is complete. Reference is also made to FIGS. 5A, 5B, 6A and 6B which are simplified flowcharts of data protection methods corresponding to TABLES V and VI, respectively. FIGS. 5A, 5B, 6A and 6B are divided into four columns. The leftmost column indicates steps performed by target side protection agent 164, the middle left column indicates steps performed by target side DPA 124, the middle right column indicates steps performed by source side DPA 112, and the rightmost column indicates steps performed by source side protection agent 144.

TABLE V

Recovery Functionality prior to Completion of Rollback

| System Component | Behavior |
|---|---|
| Target Side Agent 164 | Intercept SCSI commands issued to LU B (step 576). Redirect commands to DPA (step 580). |
| Target Side DPA 124 | Use UNDO stream of journal to roll back target storage system (step 540). Continue receiving write transactions from DPA 112 and enter these transactions into DO and DO METADATA streams without applying them to LU B (step 548). Enter TSP write transactions to TSP DO and TSP DO METADATA streams (step 564). Create a virtual image, to reply to read commands issued during the recovery process (step 572). |
| Source Side DPA 112 | As in production mode. |
| Source Side Agent 144 | As in production mode. |

TABLE VI

Recovery Functionality after Completion of Rollback

| System Component | Behavior |
|---|---|
| Target Side Agent 164 | Intercept SCSI commands issued to LU B (step 664). Redirect write transactions to DPA (step 672), and route read commands directly to LU B (step 680). |
| Target Side DPA 124 | Apply TSP write transactions to LU B, in the same manner that write transactions received from DPA 112 are applied in production mode; i.e., by entering data into TSP UNDO and TSP UNDO METADATA streams (step 640). Enter DO information and write transactions received from DPA 112 into DO and DO METADATA streams, without applying them to LU B (step 644). Apply TSP write transactions to LU B as they are received (step 656). |
| Source Side DPA 112 | As in production mode. |
| Source Side Agent 144 | As in production mode. |

Figure 5A:
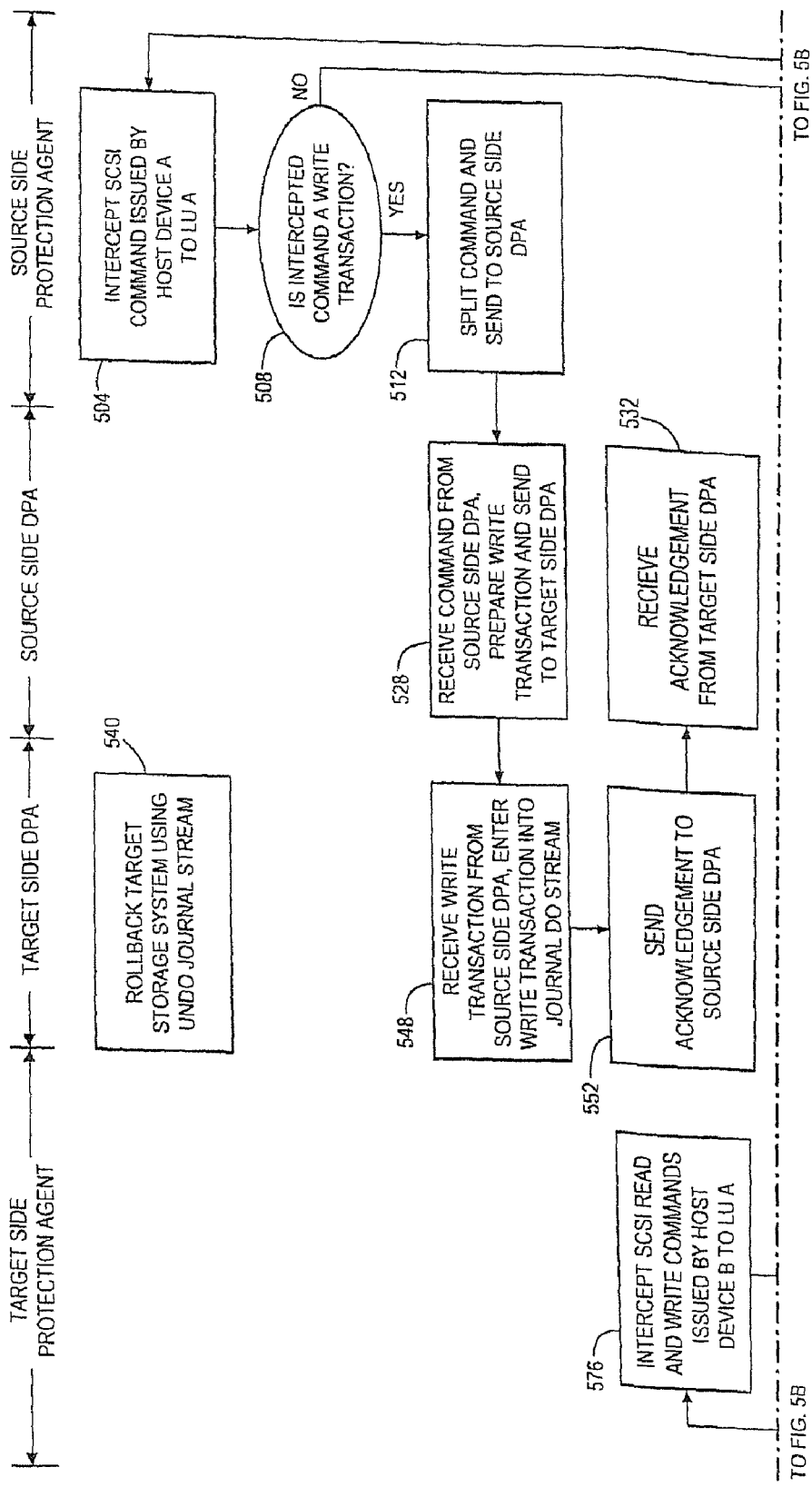
FIGS. 5A and 5B are a simplified flowchart of a data protection method during a data recovery mode, prior to completion of rollback.
Figure 5B:
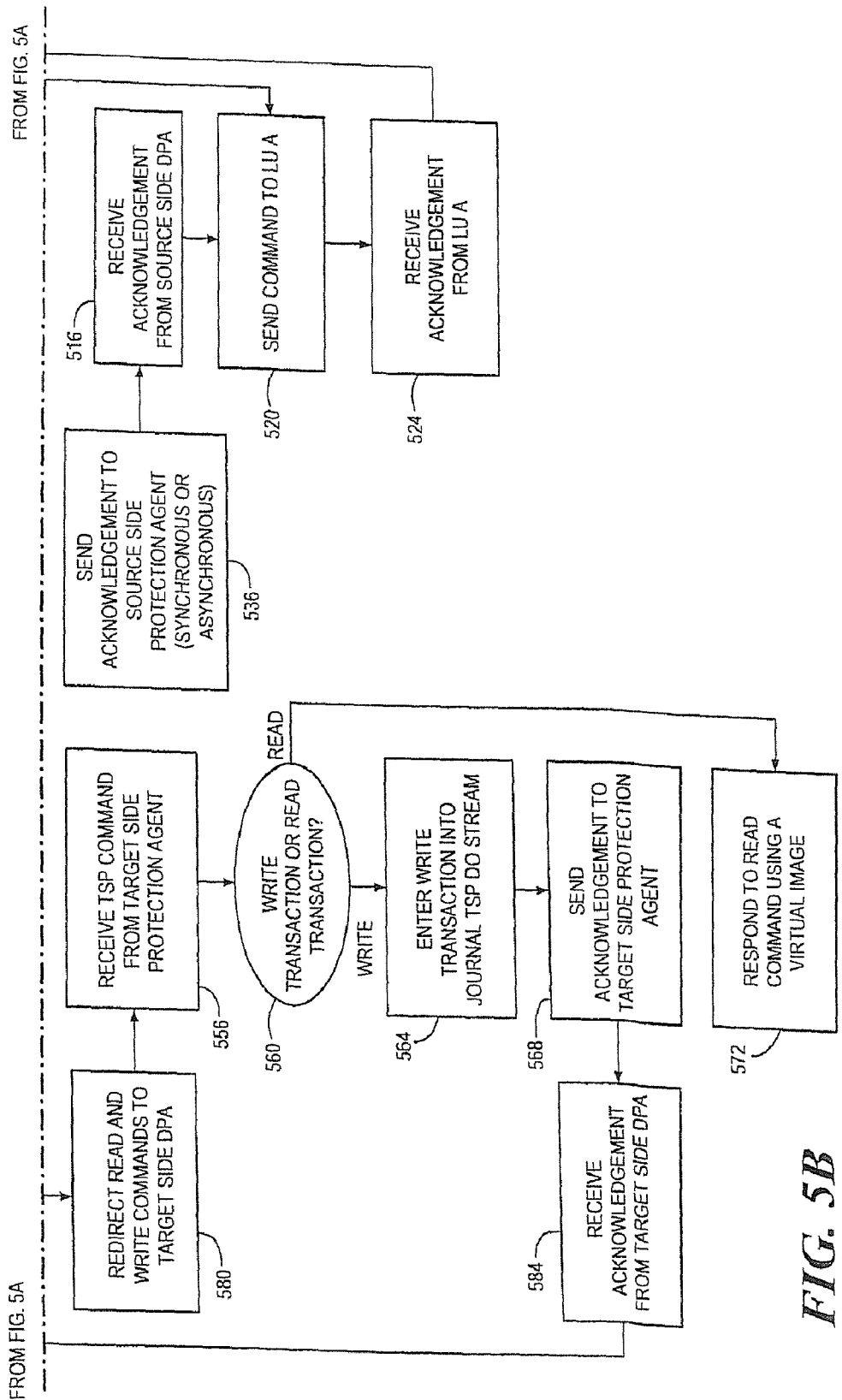
Figure 6A:
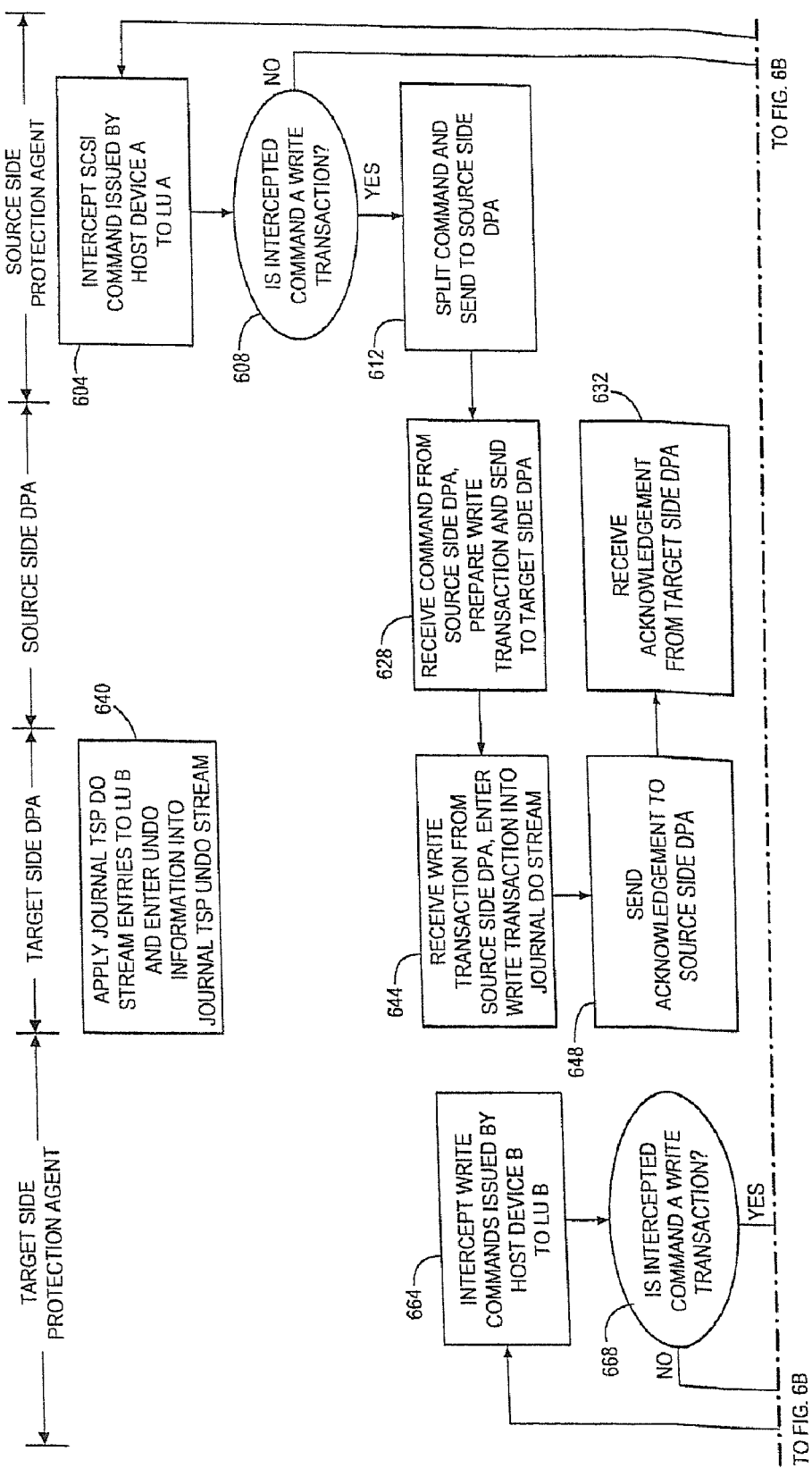
FIGS. 6A and 6B are a simplified flowchart of a data protection method during a data recovery mode, after completion of rollback.
Figure 6B:
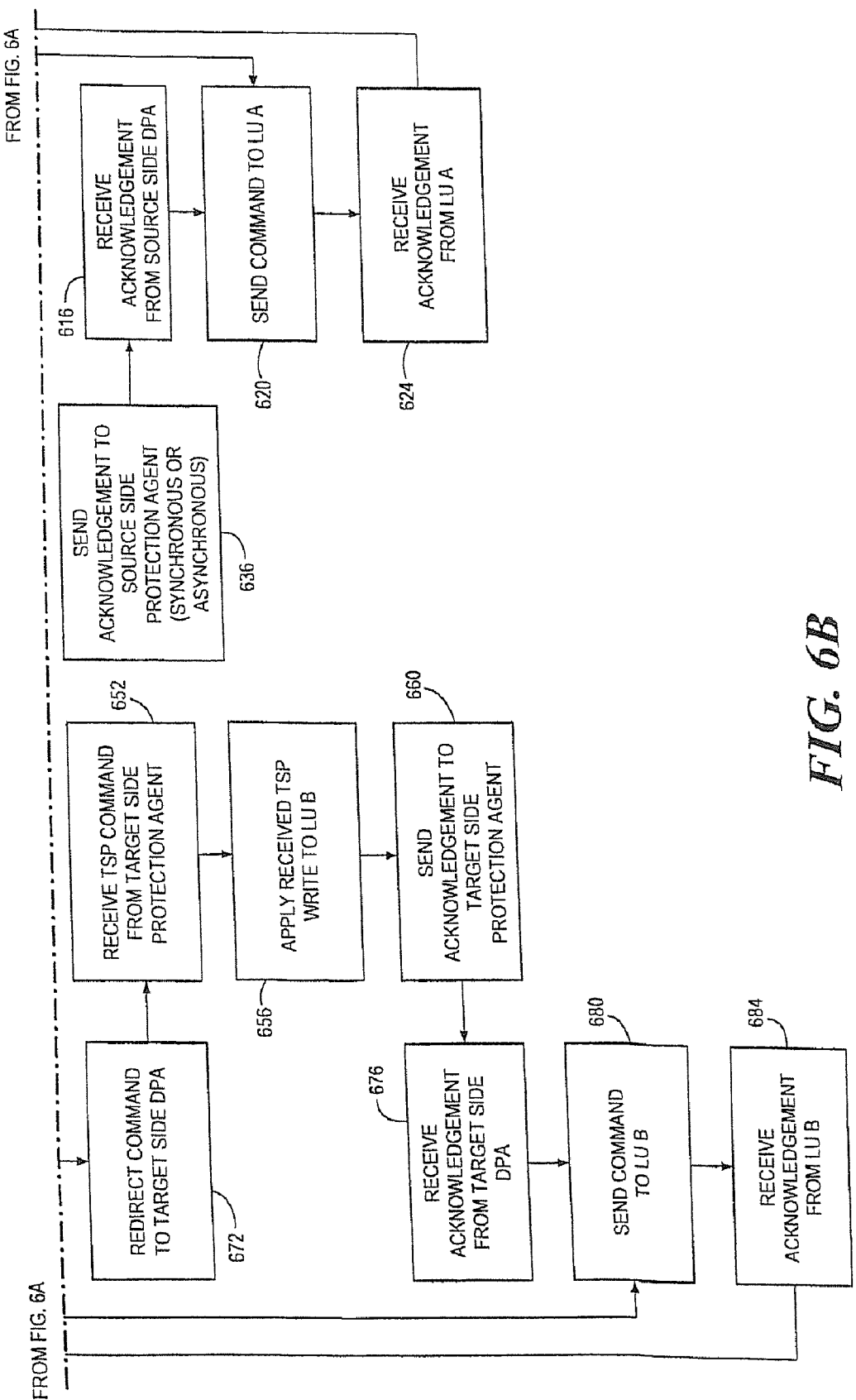

It is also noted in FIGS. 5A and 5B that the steps performed by target side DPA 124 include three non-sequential groups; namely, (i) step 540, (i) steps 548 and 552, and (iii) steps 556, 560, 564, 568 and 572. Similarly in FIGS. 6A and 6B target side DPA performs three non-sequential groups of steps; namely, (i) step 640, (ii) steps 644 and 648, and (iii) steps 652, 656 and 660.

Figure 7:
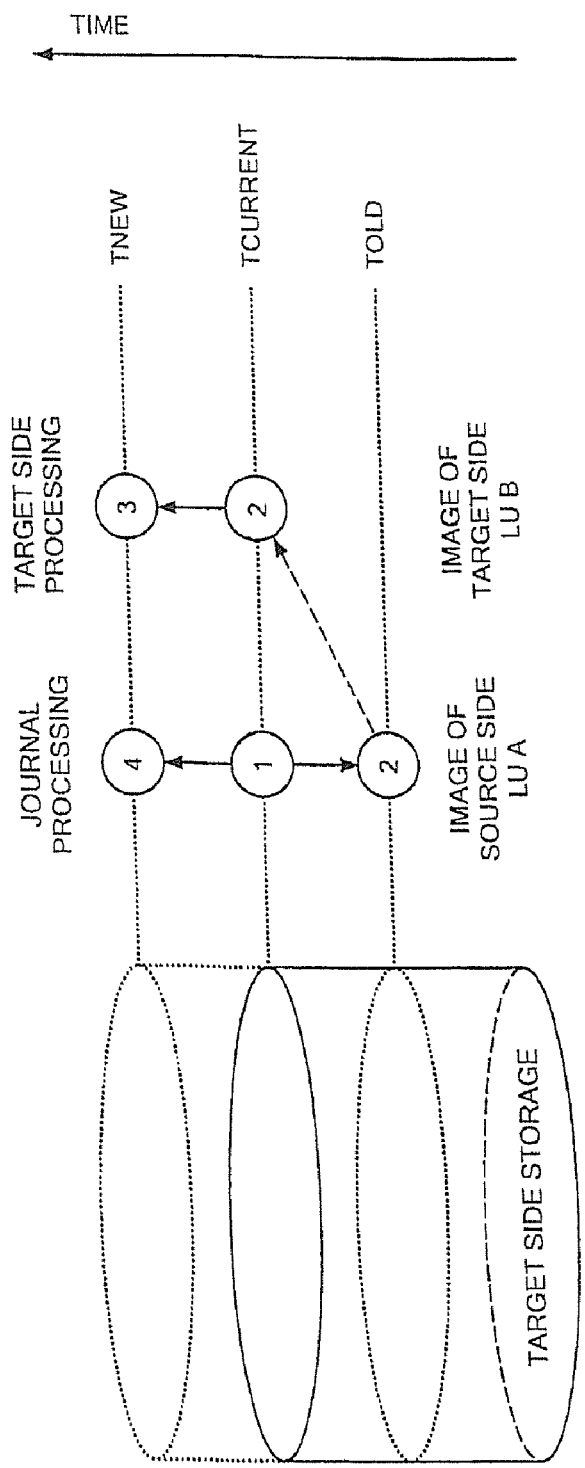
FIG. 7 is a simplified illustration of a time-line for tracking new processing of old data.

Reference is now made to FIG. 7, which is a simplified illustration of a time-line for tracking new processing of old data. FIG. 7 illustrates journal processor 180 bringing the timeline back to a previous time, TOLD, and journal processor 180 applying TSP writes to bring the timeline forward from time TCURRENT to time TNEW. As shown in FIG. 7, current data at time (1) is rolled back to old data at time (2). After rolling back the data to time (2), the rolled back data becomes the image upon which target side processing advances to new data at time (3); i.e., the target side processing is applied to data (2) and not to data (1).

The data at time (1) is a common image for LU A and LU B at the same point in time, TCURRENT. Similarly, the data at time (2) is a common image for LU A and LU B at time TOLD. Rolled back data at time (2) may be processed by TSP writes, while at the same time current data at time (1) is being processed by source side writes. As such, the data evolves along the path from time (2) to time (3) as it is processed by the target side, and along the path from time (2) to time (4) as it is processed by the source side. The data images at the source and target sides at time TNEW are thus different.

When the recovery process is completed, the user may (i) return to a normal production mode, or (ii) perform a failover by switching the replication direction. In case (i), LU B is rolled back to its state at time (2), and the write transactions along the path from (2) to (4) are applied to LU B, so as to bring LU B to the same image as LU A. Conversely, in case (ii), LU B is maintained at its state at time (3), and its data is copied from the target side to the source side so as to bring LU A to the same image as LU B.

It may be appreciated that after rolling back the UNDO data stream to LU B, the state of the target side storage is substantially identical to the state that LU A was in at an earlier point in time. However, after applying TSP writes, the state of LU B is then in a new state that is different from the earlier state of LU A. As such, in order to return to a normal production mode, and ensure that LU B is a copy of LU A, DPA 124 undoes the TSP writes that were written to LU B using the TSP undo stream, and then returns to its normal production mode and begins applying the data that was written into the DO stream. The DO stream includes all write transactions that were undone while LU B was rolled back. Additionally, the DO stream includes new journal entries that were received from DPA 112 while DPA was in recovery mode. Similarly, protection agent 164 returns to its production mode by beginning to fail I/O requests issued by host 116.

Alternatively, the user want to perform a failover; i.e., to make LU B in its current state a production LU and ensure that LU A is a copy of LU B. In this case the write transactions in the DO stream that correspond to a point in time subsequent to the recovered point in time are ignored. Additionally, the TSP writes that were applied to LU B during the recovery process are applied to LU A. Thereafter, the replication direction changes. Specifically, DPA 124 and protection agent 164 begin behaving in accordance with source site behavior, and DPA 112 and protection agent 144 begin behaving in accordance with target site behavior.

It may be appreciated that in order to provide failover capability, in which the roles of the production site and the backup site are switched, it is desirable that the source side has the necessary system components to function as a target side, and vice versa. Thus, in one example, the source side includes its own journal LU 184 and journal processor 188, as indicated with dotted lines in FIG. 1.

Figure 8:
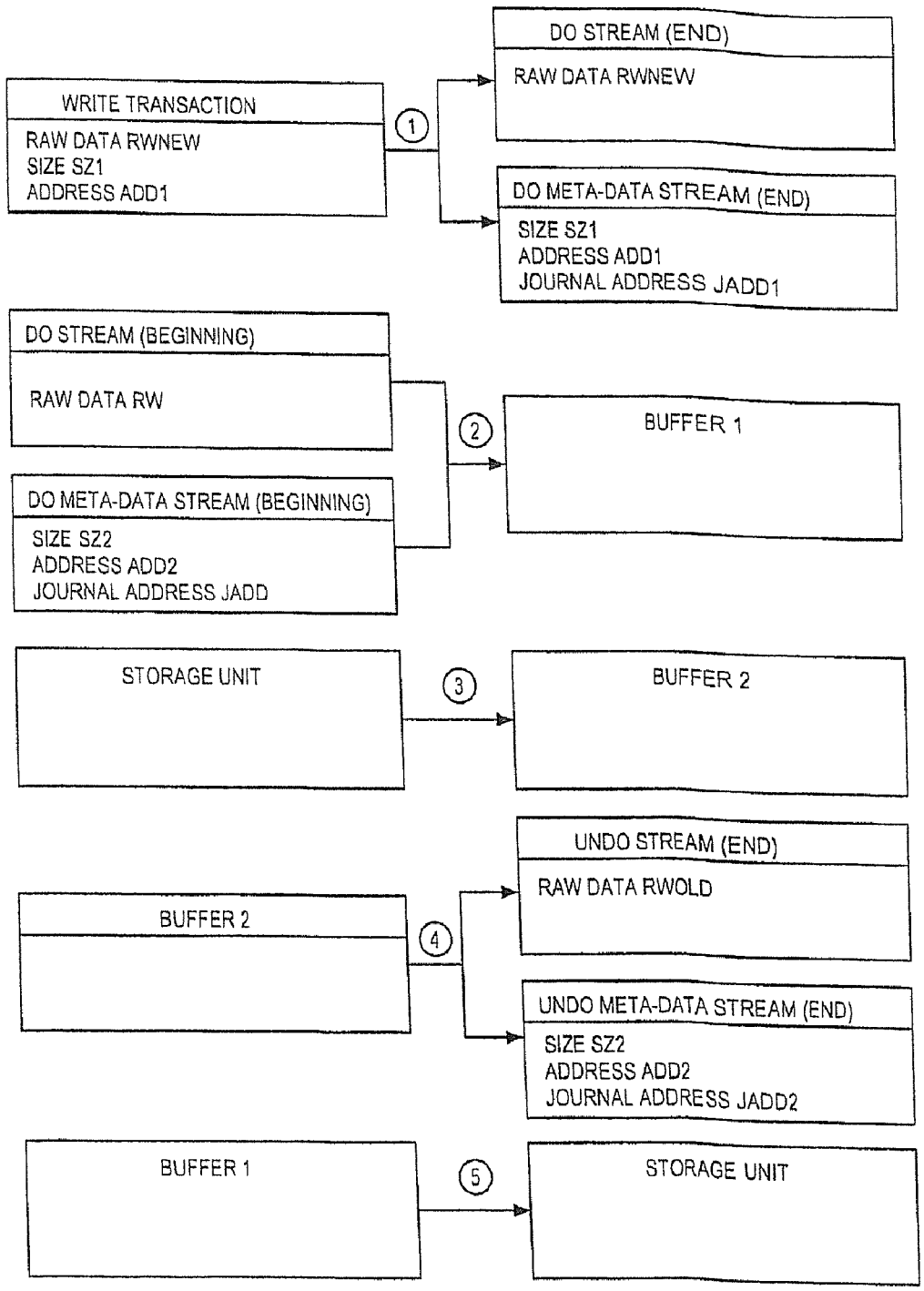
FIG. 8 is a simplified illustration of a five-stage journaling process for continuous data replication.

Referring back to TABLE I, it may be appreciated that during normal data replication, for each write transaction received from a production site, there are five I/O operations performed at a backup site. Reference is now made to FIG. 8, which is a simplified illustration of a 5-stage journaling process for continuous data replication. The five steps shown in FIG. 8 correspond respectively to the five steps listed in TABLE I. For the sake of clarity, FIG. 8 only shows three meta-data elements; namely, a size, a journal address and a storage address. It may be appreciated that the meta-data in the DO METADATA and UNDO METADATA streams includes an ID, a time, and other attributes.

In one example, the meta-data for each transaction is of a fixed size, typically 30 bytes. The raw data varies in size, typically averaging around 10 KB per transaction.

As write transactions performed at a production site vary in frequency, and as each write transaction at the production site normally requires five I/O transactions at the backup site, it may be appreciated that the size of the DO stream grows and shrinks accordingly. When the I/O rate is low, the beginning of the DO stream is close to the end of the DO stream. In such case, it is possible to keep all write transactions between the beginning and the end of the DO stream in memory, and there is no need to read the beginning of the DO stream for every new transaction received in the backup site. As such, step 2 may be skipped.

Figure 9:
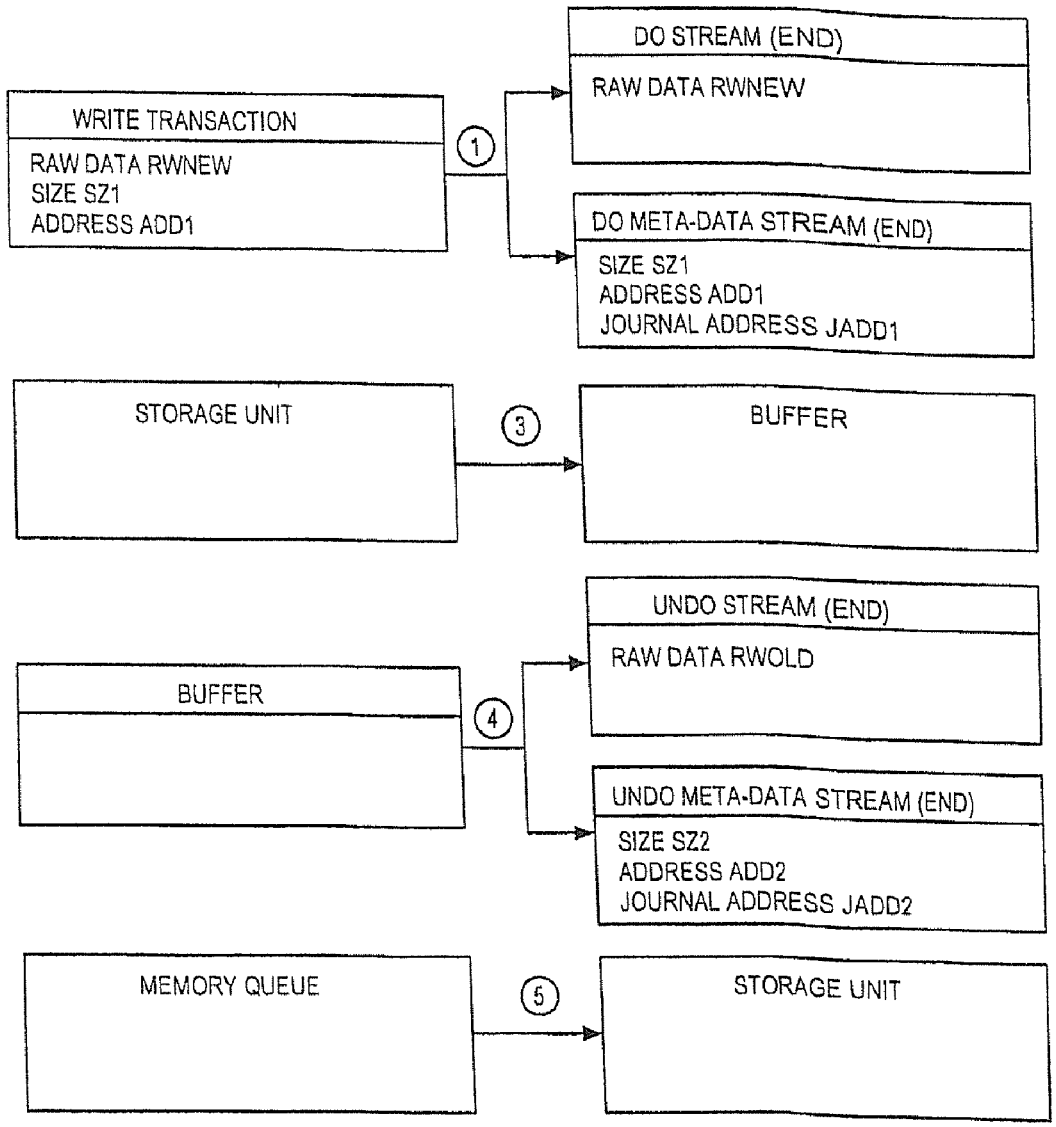
FIG. 9 is a simplified illustration of a four-stage journaling process for continuous data replication, for use when an I/O data rate is low.

Reference is now made to FIG. 9, which is a simplified illustration of a 4-stage journaling process for continuous data replication, for use when an I/O data rate is low. The first step in FIG. 9 copies the write transaction to the end of the DO stream and the end of the DO METADATA stream, as in the 5-stage journaling process. Unlike, the 5-stage journaling process, though, instead of reading write transaction data from the beginning of the DO and DO METADATA streams, the 4-stage journaling process takes advantage of the fact that the write transaction that was just received at the backup site is still resident in memory. For this write transaction, steps 3-5 are performed, as indicated in FIG. 9.

However, during the steps 3-5 distribution of the write transaction that was just received, it is possible that a new transaction arrives at the backup site. In order to keep pace with the arriving transaction, as each write transaction is entered into the ends of the DO and DO METADATA streams, the write transaction is written into the end of a queue in memory. In one example, the queue in memory is handled similar to the way the DO stream is handled; namely, each received write is appended to the end of the queue, and when a write transaction is distributed according to steps 3-5, a subsequent write transaction is taken from the beginning of the queue. Effectively, the queue corresponds to a cached DO stream.

The 4-stage journaling process is used until the queue in memory is full, at which point the normal 5-stage journal processing is resumed. Also in the event of a disaster, the normal 5-stage journal processing is resumed. In order to resume the 5-stage journal processing, it is important to identify the last write in the DO stream that was written. As such, even during the 4-stage journal processing, the pointers to the first and last write transactions in the DO stream are updated.

Conversely, when the I/O rate is high, in order to control the size of the DO stream and ensure that it does not overflow its disk allotment, the normal 5-stage mode may be switched to a faster 3-stage mode whenever the DO stream reaches a large percentage of its maximum capacity, typically 80%. The faster 3-stage mode is switched back to the normal 5-stage mode whenever the DO stream is reduced to a smaller percentage of its maximum capacity, typically 75%.

The 3-stage mode eliminates steps 3 and 4 from the normal mode; namely, the steps that record the UNDO information. As such, rollback of the backup storage unit to its state at the times of those transactions processed with the 3-stage mode is not possible.

Figure 10:
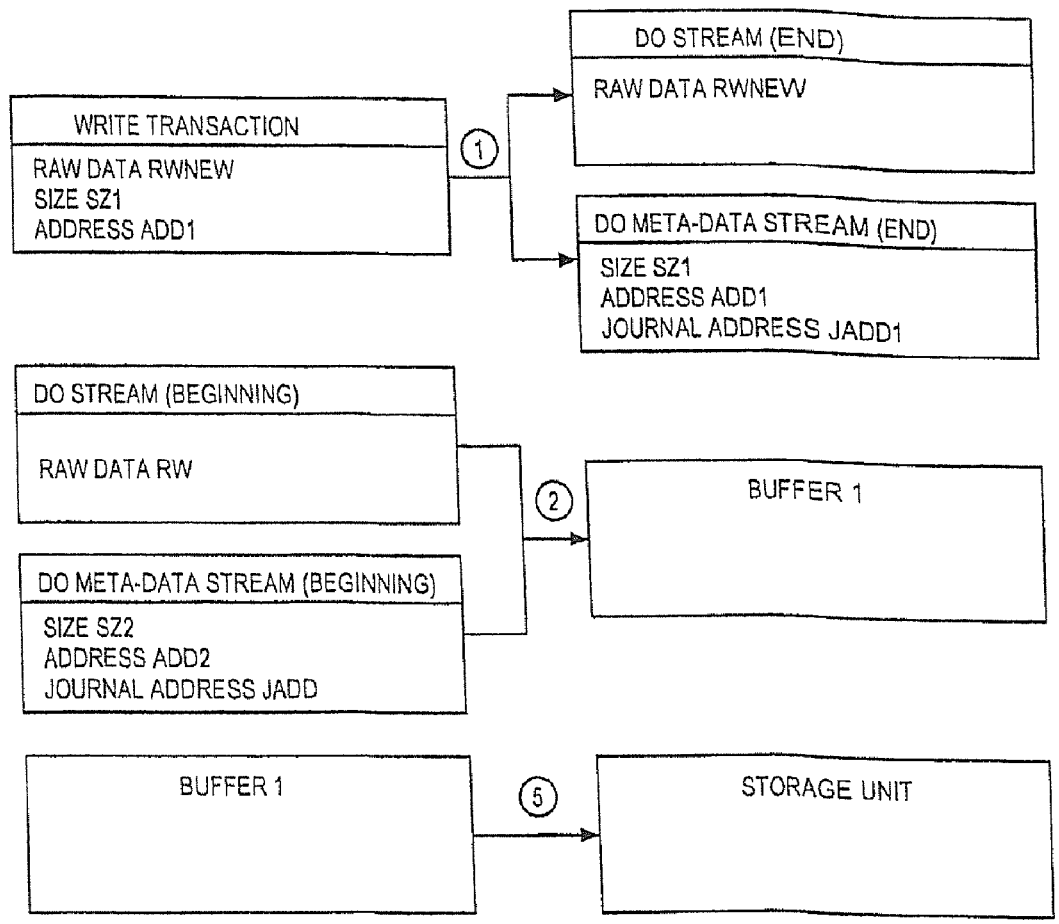
FIG. 10 is a simplified illustration of a three-stage journaling process for continuous data replication, for use when an I/O data rate is high.

Reference is now made to FIG. 10, which is a simplified illustration of a 3-stage journaling process for continuous data replication, for use when the DO stream is near its maximum capacity.

TABLE VII summarizes the relative pros and cons of each of the journaling processes described hereinabove.

TABLE VII

Pros and Cons of Journaling Processes

| Journaling Process | Pros | Cons |
| --- | --- | --- |
| 3-Stage Journaling | Fastest replication time | Long time to recover to current time |
| 4-Stage Journaling | Moderate replication time; Full data recovery capability | Only able to be used as long as the beginning and the end of the DO stream are close |
| 5-Stage Journaling | Full data recovery capability | Slowest replication time |

One data replication strategy is the set of automated rules for controlling when a data replication system transitions between 5-stage, 4-stage and 3-stage journal processing. As mentioned hereinabove, transitions from 5-stage to 3-stage journaling, and from 3-stage back to 5-stage journaling, may be controlled based on the current size of the DO stream. Transitions from 5-stage to 4-stage journaling may be automated to occur when the beginning and end of the DO stream are close; and transitions from 4-stage back to 5-stage journaling may be automated to occur when the memory queue reaches its capacity.

Figure 11:
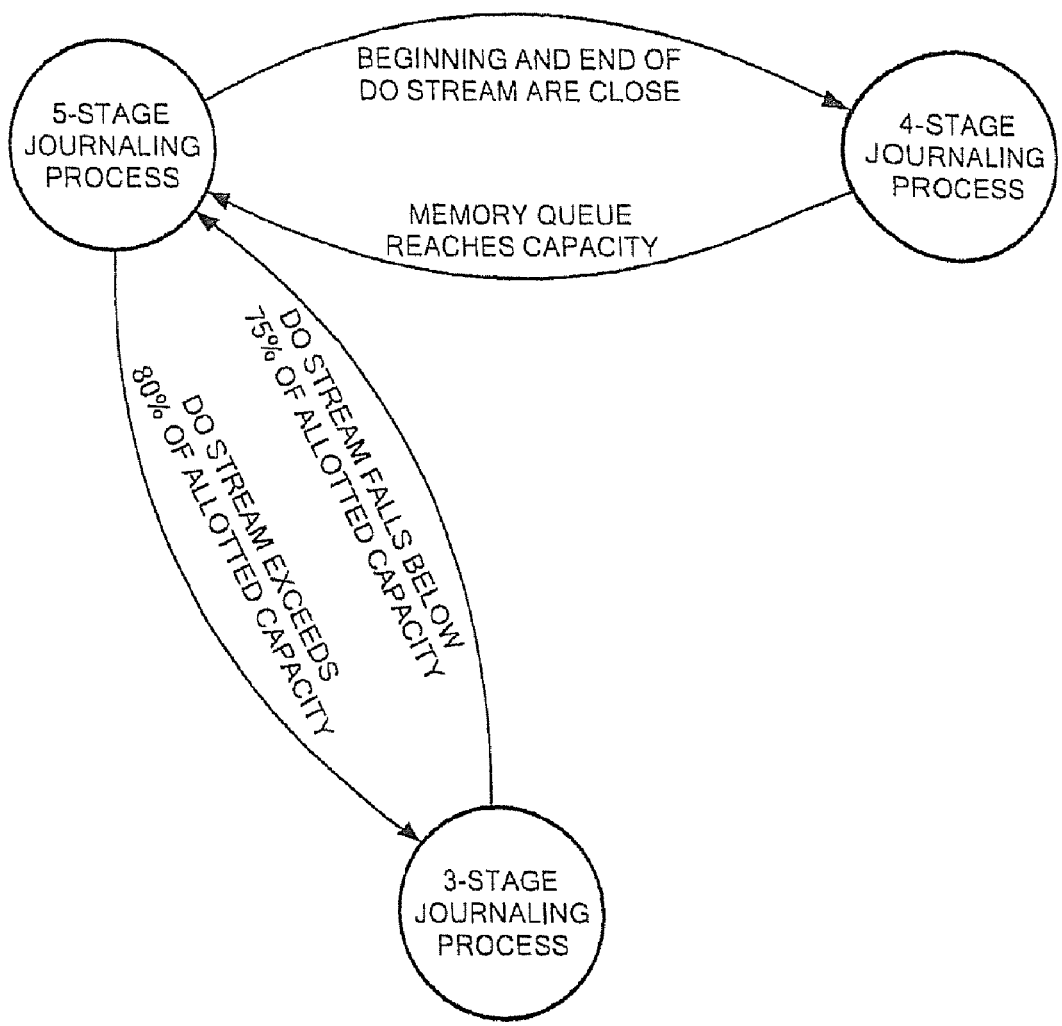
FIG. 11 is a simplified state diagram of transitions between 5-stage, 4-stage and 3-stage journal processing.

Reference is now made to FIG. 11, which is a simplified state diagram of transitions between 5-stage, 4-stage and 3-stage journal processing. Shown in FIG. 11 are three nodes, representing each of the journaling processes, and directed edges between the nodes corresponding to rules that govern transitions therebetween. As shown in FIG. 11, a 5-stage to 3-stage transition occurs when the size of the DO stream exceeds 80% of its allotted capacity, and a 3-stage to 5-stage transition occurs when the size of the DO stream falls under 75% of its allotted capacity. Similarly, a 5-stage to 4-stage transition occurs when the beginning and end of the DO stream are close; and a 4-stage to 5-stage transition occurs when the memory queue reaches its capacity.

It will be appreciated by those skilled in the art that using 4-stage journaling enables a data replication system to keep pace with higher I/O rates than can be handled when using 5-stage journaling. If the system is currently using 5-stage journaling and the I/O rate is higher than can be handled, a lag increases until the system necessarily transitions to the 3-stage journaling process. However, if the system can catch up with the lag, empty the DO stream and transition to a 4-stage journaling process, then the system can accommodate higher I/O rates before transitioning back to the 5-stage journaling process.

In this regard, it is noted that in general, if the system cannot keep pace with I/O rates using a 4-stage journaling process, then it most probably cannot keep pace using a 5-stage journaling process, and in either case the system would have to transition to a 3-stage journaling process. However, since the I/O rate changes continuously, a transition from 4-stage journaling to 5-stage journaling does not necessarily push the system to 3-stage journaling.

Figure 12:
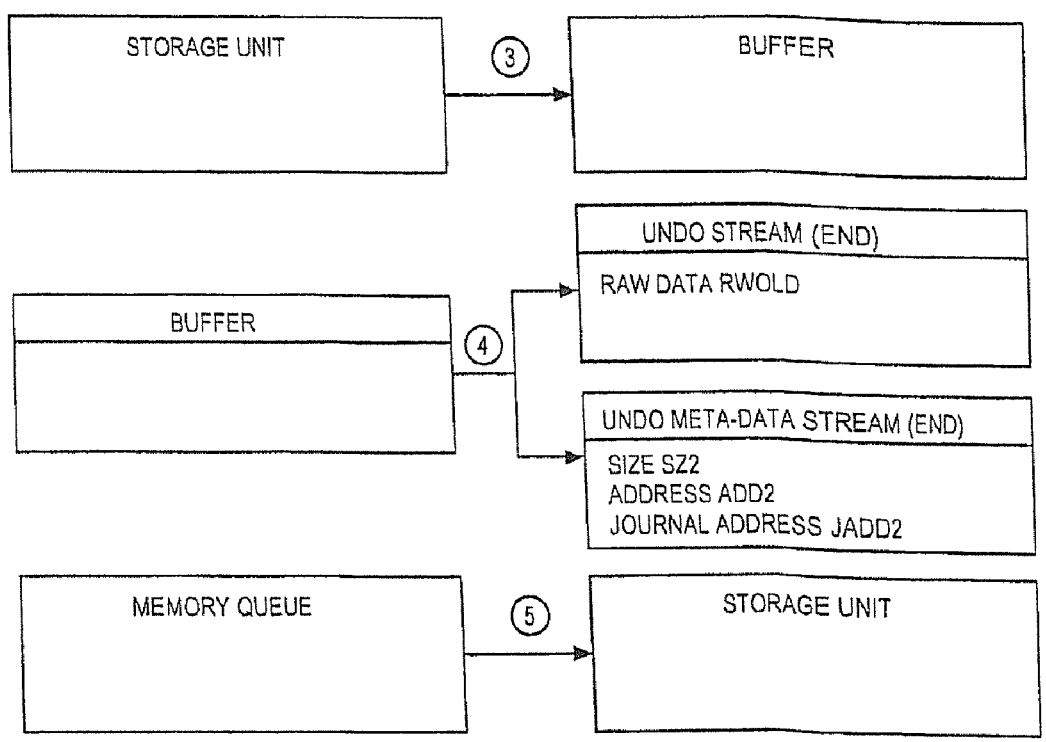
FIG. 12 is a simplified illustration of a variant of the three-stage journaling process shown in FIG. 10.

Reference is now made to FIG. 12, which is a simplified illustration of a variant of the three-stage journaling process shown in FIG. 10. The alternative 3-stage journaling proceeds according to the last three stages of the 4-stage journaling process. That is, the stage of writing to the DO stream is skipped within 4-stage journaling, for the alternative embodiment of 3-stage journaling. When performing 4-stage journaling, the backup site DPA (element 124 of FIG. 1) can return an acknowledgement to the production site DPA (element 112 of FIG. 1) immediately after the first stage, when the write transaction is written to the DO stream. However, when performing the alternative 3-stage journaling, the backup site DPA must wait until the write transaction is written to storage, before it can return an acknowledgement to the production site DPA. Since the last three stages of 4-stage journaling can be performed in a separate thread than the thread that performs the first stage, the alternative 3-stage journaling may result in a longer time lag between the source and target sites.

In another aspect, during the initialization process to synchronize first and second volumes a map is generated to identify changes between a current volume state and the most updated state. The map is used to enable signature testing only on locations where the volume is updated.

A delta marker stream contains the locations that may be different between the latest I/O data which arrived to the remote side (the current remote site) and the latest I/O data which arrived at the local side. In particular, the delta marking stream includes metadata of the differences between the source side and the target side. For example, every I/O reaching the data protection appliance for the source 112 is written to the delta marking stream and data is freed from the delta marking stream when the data safely arrives at both the source volume of replication 108 and the remote journal 180 (e.g. DO stream). Specifically, during an initialization process no data is freed from the delta marking stream; and only when the initialization process is completed and I/O data has arrived to both local storage and the remote journal data is I/O data from the delta marking stream freed. When the source and target are not synchronized, data is not freed from the delta marking stream. The initialization process starts by merging delta marking streams of the target and the source so that the delta marking stream includes a list of all different locations between local and remote sites. For example, a delta marking stream at the target might have data too if a user has accessed an image at the target site.

The initialization process creates one virtual disk out of all the available user volumes. The virtual space is divided into a selected number of portions depending upon the amount of data needed to be synchronized. A list of 'dirty' blocks is read from the delta marker stream that is relevant to the area currently being synchronized to enable creation of a dirty location data structure. The system begins synchronizing units of data, where a unit of data is a constant amount of dirty data, e.g., a data that needs to be synchronized.

The dirty location data structure provides a list of dirty location until the amount of dirty location is equal to the unit size or until there is no data left. The system begins a so-called ping pong process to synchronize the data.

Figure 13:
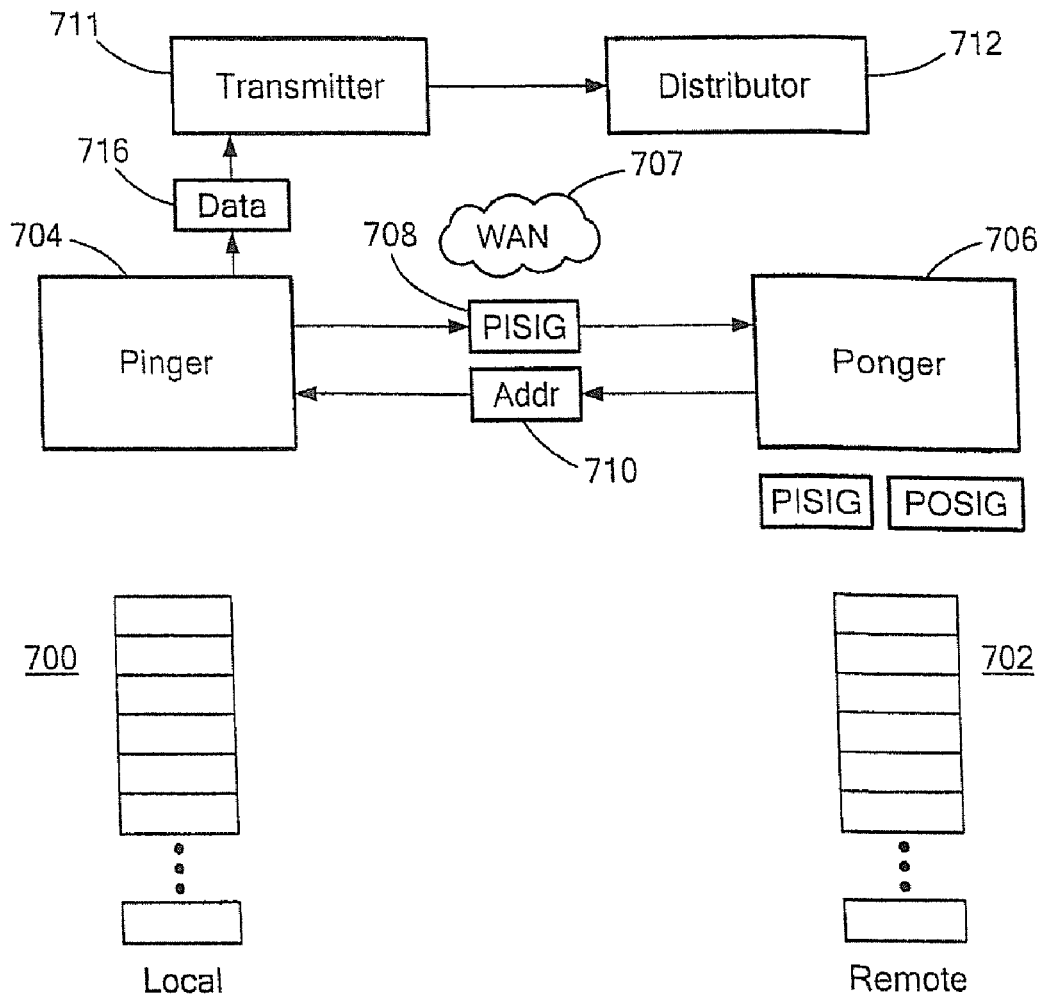
FIG. 13 is a schematic depiction of a volume synchronization environment.

FIG. 13 shows an exemplary synchronization environment in accordance with exemplary embodiments. During initialization, a first volume 700, such as a local volume (e.g., at the source side), is synchronized with a second volume 602, such as a remote volume (e.g., at the target side). A pinger module 704 on the local appliance 112 and a ponger module 706 on the remote appliance 124 examine data and selectively exchange information to efficiently perform initialization for making data in a remote site identical to data in a local site before replicating data in the remote volume. The local user volume 700 interacts with the pinger module 704, which is coupled to a WAN 707. The remote user volume 702 interacts with the ponger module 706.

In general, the pinger module 704 reads data from a part of the local user volume 700, signs the data (i.e. calculates a hash function of the data), and transmits the signature 708 to the ponger module 706. The ponger module 706 reads from the same part of the remote user volume 702, signs the data, and compares the signatures. The ponger module 706 transmits to the pinger module 704 addresses 710 of the user volume blocks where data differs. If there are differences, the pinger module 704 again reads the data from the local user volume 700 and transmits the data 716 to the distributor 712 on the remote side through a transmitter 711.

Figures 13A, 14:
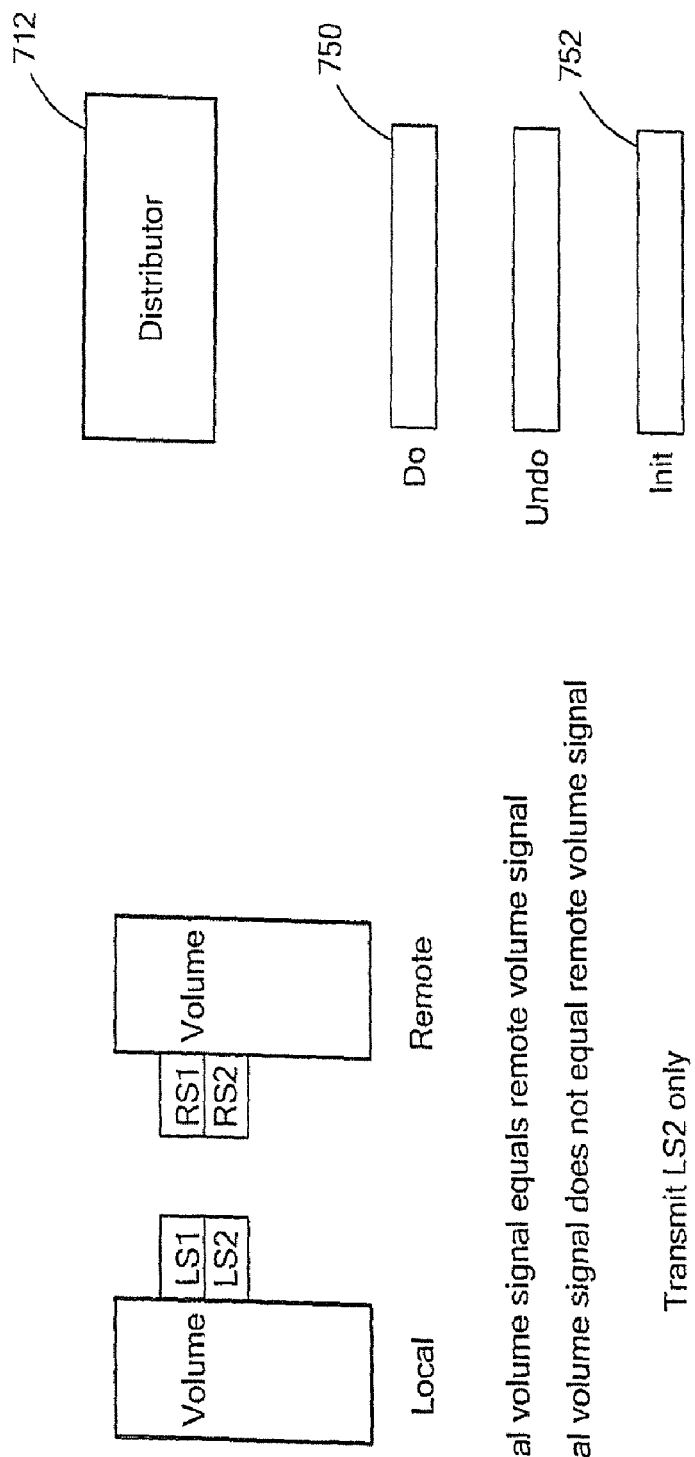
FIG. 13A is a block diagram showing data signature comparison during volume synchronization.
FIG. 14 is a schematic depiction of a distributor for data streams using during volume synchronization.

As shown in FIG. 14, during initialization process, the distributor 712 processes initialization data from the pinger module 704, which is written to the DO stream 750 while application data arriving in the local site is written to a temporary initialization stream 752. When the initialization data has been sent, the initialization stream 752 and the DO stream 750 are united to create an initialization snapshot and then the data is written to the user volume 700.

Some simplifications are made for the above description. A signature is used only if calculation of data reduction shows that signature usage saves bandwidth. In addition, the signature replacement process can be layered (i.e., calculate all the signature for the unit but at the beginning send only aggregated signatures from local to remote e.g., send a signature for every 256 blocks, then on the remote if the signature on all 256 block is different, check only for the block signature on one block level).

There are a number of reasons to use data signatures for initialization. Bandwidth is saved if local and remote volumes are almost identical, which can happen either if remote storage was restored from backup, or if a disaster causes a loss of markers. Journal space is also saved by using signatures.

However, signatures can be used only if remote user volumes are updated with the latest image. Conventional systems do not use signatures if the remote copy is not updated to the last image. The remote copy may not be the latest for a number of reasons, such as a user being mounted on a point in time image at the remote site, a stoppage of the initialization process, and period in which the system could not handle I/Os in five phase distribution so that a gap is created between the latest image in the journal and the latest image in the user volume, as described in detail above.

In one aspect, when the initialization process begins, if signature usage is not allowed, such as described above, a dirty location map is created to identify locations for which distribution from the DO stream to the UNDO stream has not yet taken place (or data written during logged access mode to the TSP stream). In one embodiment, the dirty location map is generated from the DO metadata stream and the TSP metadata stream. When the dirty location map is ready, the system can begin using data signatures to compare data between local and remote volumes. Signatures are not used for locations in the dirty location map. In addition, if a point in time image is currently mounted or being mounted, the dirty location map is updated with any I/O write operations.

Figure 15:
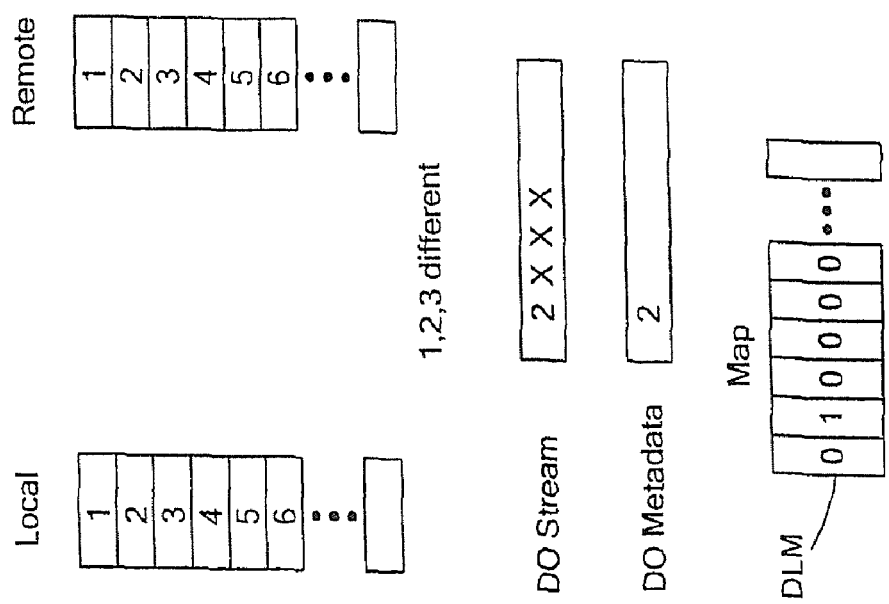
FIG. 15 is a schematic depiction of dirty location map generation as part of volume synchronization.

FIG. 15 shows an example of a dirty location map generation. A first volume V1 has blocks 1-6 and a second volume V2 has corresponding blocks 1-6. It is determined that blocks 1, 2, and 3 of the local and remote volumes have differences that need to be addressed for initialization.

The DO stream contains a series of entries including an entry for block 2, which has not yet been distributed. A corresponding entry for block 2 is contained in the DO metadata stream. In the present example, only block 2, of differing blocks 1-3, has an entry in the DO stream, and thus, signatures should not be used for block 2.

A dirty location map (DLM) is generated from the DO metadata stream. Only the entry for block 2 is set for blocks 1-6 of the volumes since block 2 is the only block contained in the DO metadata stream. In this example, a logical ONE is set in the dirty location map DLM for locations having entries in the DO stream.

In the present example, blocks 1, 2, and 3 were found to have differences to be addressed during initialization. Block 2 has an entry in the DO stream, which is reflected in the dirty location bit map DLM. Thus, a data signature for block 2 should not be sent. However, data signatures can be sent for blocks 1 and 3.

Figure 16:
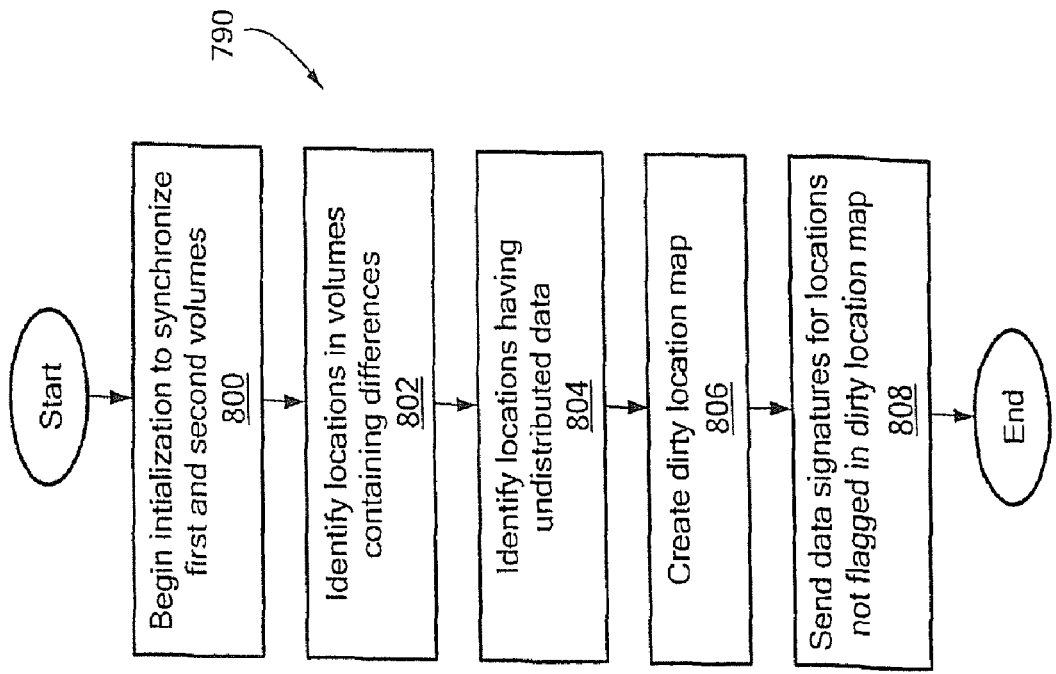
FIG. 16 is a flow diagram showing an exemplary sequence of steps for volume synchronization with selective data signature transmission.

FIG. 16 shows an exemplary process, an initialization process 790, for implementing selective signature transmission for initialization in a continuous data protection system in accordance with exemplary embodiments described herein.

In a process step 800, the initialization process 790 begins to synchronize first and second volumes from a local (source) and a remote (target) sides. In process step 802, differences between blocks in a first volume and corresponding blocks in a second volume are identified. In process step 804, a data stream containing data that has not been distributed to/from the data volumes is examined to identify locations for data distribution. In an exemplary embodiment, the DO metadata stream is examined to identify the locations.

In process step 806, a dirty location map is created in which locations contained in the DO metadata stream are flagged. In an exemplary embodiment, the dirty location map provides a bitmap where each bit corresponds to block. In other embodiments, a bit corresponds to a number of disk blocks. The dirty location map is used such that for flagged locations data signatures are not sent during the initialization process. Data signatures can be used for non-flagged locations. In process step 808, data signatures are sent for locations not flagged in the dirty location map as part of the volume synchronization process.

It is understood that the initialization process can occur while a user is currently mounting an old point in time. During the mount time, data is distributed from the undo stream to the DO stream, this process can happen while the initialization process is actually running, meaning, the do stream actually grows and contains more data during the initialization. When data moves from the UNDO stream to the user volume and the redo data is written to the DO stream, the user volume gets less updated and the system needs to add the locations to the dirty location bitmap, so every redo data written to the DO stream updates the bitmap It is further understood that when the user is already mounted on a point in time in a logged access mode (TSP mode), for every I/O the user writes the system first writes the UNDO data for the I/O.

A delta marker stream (DMS) is a stream of metadata which includes the locations that may be different between the production volume (also described herein as the source side volume) and the replication volume (also described herein as the target side volume) in case of a disaster (e.g., DPA failure, cable failure, WAN failure, temporary storage failure, and so forth). This includes I/Os completed to the source volume which have not yet been applied to the replication journal 176 and I/Os applied to the replication journal 176 and have not yet completed to the production volume 108.

Figure 17:
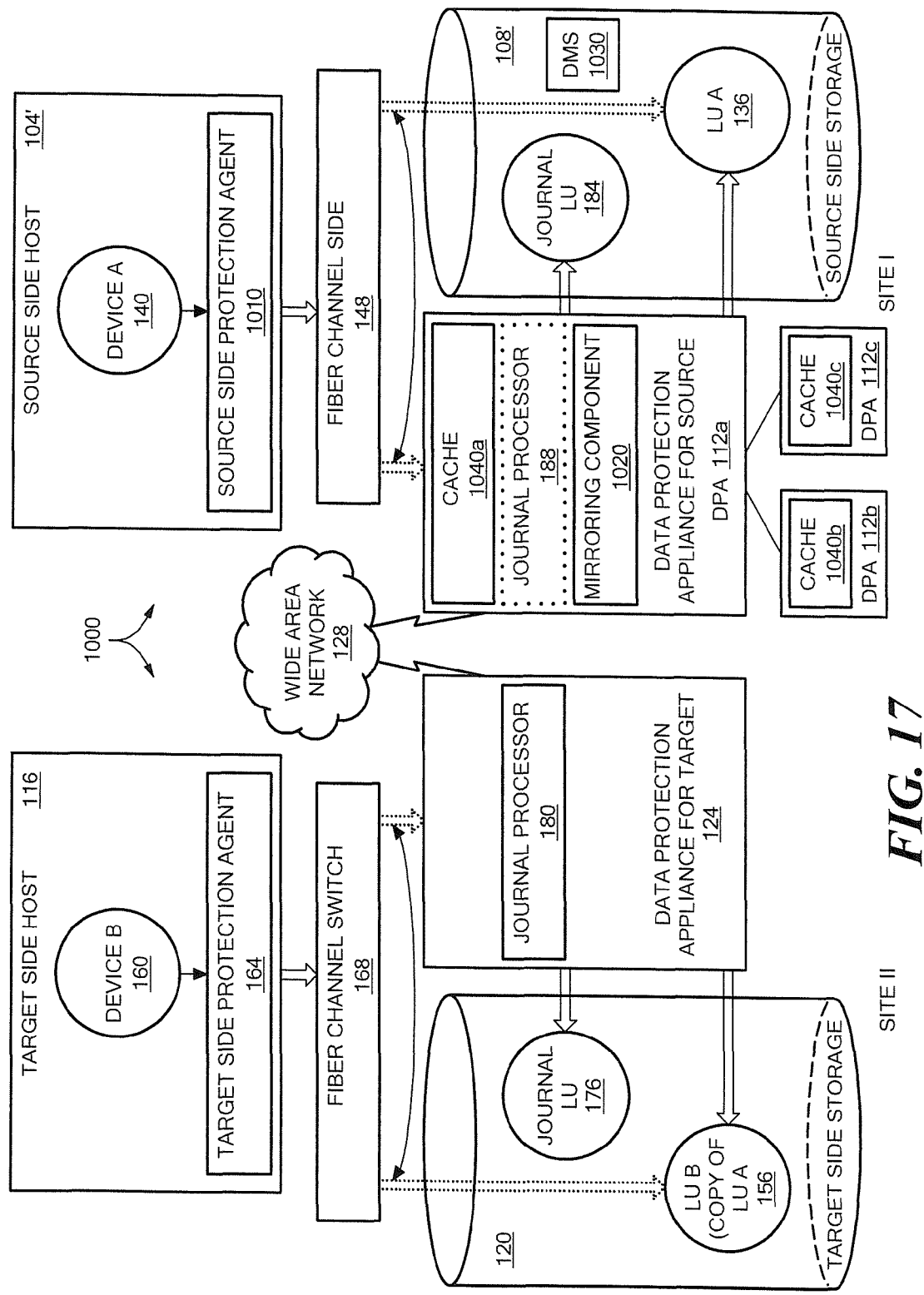
FIG. 17 is a simplified block diagram of another embodiment of a data protection system.

The delta marker stream is stored persistently on a storage LUN (e.g., DMS 1030 in FIG. 17).

There are at least two methods for handling the metadata in the delta marking stream.

A first method, called synchronous marking, is when the DPA sends an acknowledgement message to the protection agent only after the metadata of the I/O is written to the delta marking stream. Synchronous marking in general reduces the performance of the system 1000.

A second method, called asynchronous marking, is when a cache of the metadata of the latest transactions is held and the cache is flushed periodically. However, asynchronous marking is also problematic. For example, if a DPA fails, the data in the cache is lost. A common solution is to keep a super set of the DPA delta marking cache in the splitter memory (e.g., protection agent); however this complicates the splitter code and the splitter code must be modified each time for newer platforms. Another problem with the splitter holding the metadata is that is some cases the splitter and a virtual DPA may actually run on the same physical hardware thus the splitter and the virtual DPA may fail at the same time.

Described herein is a process to mirror metadata not yet committed to the delta marking stream. Rather than storing the uncommitted metadata at a protection agent; the uncommitted metadata is stored in a cache (e.g., one of caches 1040a-1040c in FIG. 17) at another DPA, for example. With this approach, a protection agent is simplified. While the description focuses on mirroring uncommitted metadata within a data protection environment, the techniques described herein may be used in any data environment to mirror data.

Referring to FIG. 17, a data protection system 1000 includes a source-side host 104' similar in functionality to the source-side host 104, for example, but with a less complex protection agent 1010 (e.g., the protection agent 1010 may run on the host on a switch on the storage array or on any other device on the data path). The system 1000 also includes a source side storage 108', similar to source-side storage 108, which includes a persistent delta marking stream (DMS) 1030 (e.g., the delta marker stream (DMS) resides on a LUN in the storage volume).

The data protection system 1000 also includes a DPA 112a similar in functionality to the DPA 112, for example and includes a journal processor 188 and a mirroring component 1020 used to mirror uncommitted metadata. The uncommitted metadata refers to the metadata for the delta marking stream not yet moved to the persistent storage (DMS 1030) and represents the differences in the I/O data between the target and the source side storage.

The data protection system 1000 further includes a cluster of DPAs which includes the DPA 112a as well as a DPA 112b and a DPA 112c. In other examples, there may be two or more than three DPAs. Each DPA includes a cache to store mirrored metadata (e.g., DPA 112a includes a cache 1040a, DPA 112b includes a cache 1040b and DPA 112c includes a cache 1040c). As described herein, for each DPA in the cluster, the DPA will choose a mirror DPA on the same production site which will be used to mirror the uncommitted metadata. For example, DPA 112a may choose DPA 112b or 112c, the DPA 112b may choose DPA 112a or DPA 112c and so forth. Thus, cache 1040a stores uncommitted metadata for DPA 112a but also serves to mirror uncommitted metadata from another DPA in the cluster. Though each DPA has a cache to store its own respective uncommitted metadata and to store mirrored uncommitted metadata from at least one other DPA, one of ordinary skill in the art may clearly separate the cache 1040 into multiple sub-caches with each sub-cache dedicated to at least one DPA.

For simplicity, the description herein will describe the DPA 112a mirroring on the DPA 112b. In particular, the mirroring mechanism mirrors the uncommitted metadata arriving from the DPA 112a to the DPA 112b. This mirroring protocol assures that if the DPA 112a fails, the DPA 112b will have the uncommitted metadata for DPA 112a stored in its cache 1040b.

The metadata mirroring mechanism, as used herein, includes at least three different modes of operation: a fragile mode, a mirror mode and a stable mode. A mirror mode means that the uncommitted metadata is mirrored, for example, at another DPA 112b-112c. The fragile mode means that there is no mirroring (e.g., no place to mirror the uncommitted metadata). Any failure of the DPA 112a during the fragile mode will require that the system 1000 perform a complete sweep of the data (since the uncommitted metadata, which is only in the memory of DPA 112a before the failure, is completely lost). The stable mode means that the system 1000 has all of its uncommitted metadata moved into the persistent DMS 1030. No new metadata I/Os can be received at the DPA 112a and the DPA 112a will fail any new I/Os.

The protection agent 1010 needs only to perform one of the following in the event the DPA 112a fails:
 1. Complete the IOs that failed to the DPA 112a and track the locations that changed in the splitter memory or
 2. Fail the I/Os.

Thus, implementing a protection agent (e.g., splitter) which tracks only I/Os that fail to the DPA 112a is significantly easier than a protection agent which has to hold the uncommitted metadata of the delta marking stream. For example, since in general any mirroring systems typically hold the list of locations where mirroring has failed, implementation is easier to achieve than creating a new splitter (e.g., protection agent) for each new data protection system, and a general mirroring system can be changed to a splitter with no significant effort.

Figure 18:
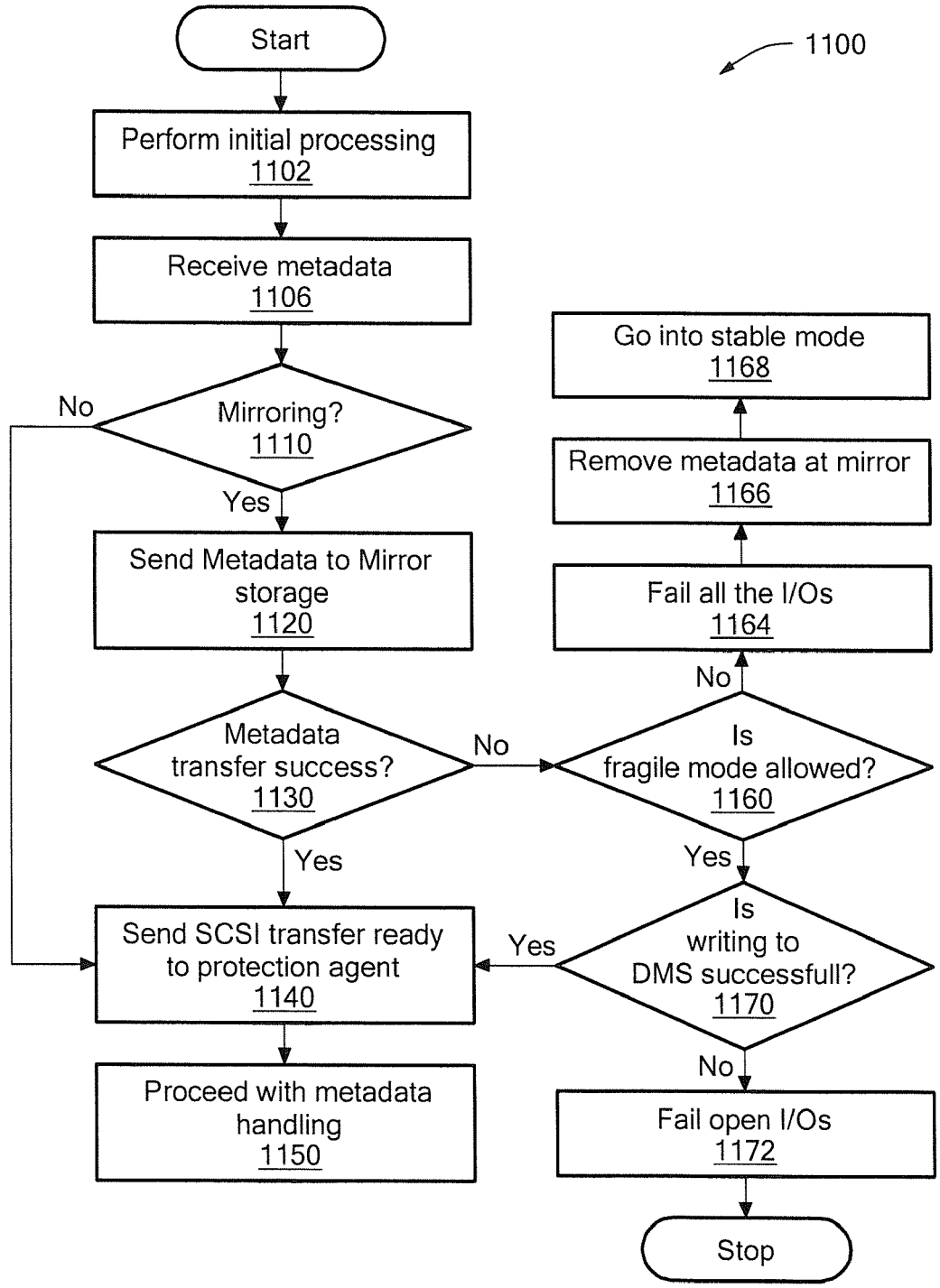
FIGS. 18 and 20 are flow diagrams of examples of processes used in mirroring.

Referring to FIG. 18, one example of a process to mirror the uncommitted metadata between two DPAs (e.g., in a cluster) is a process 1100. Initial processing is performed (1102). For example, a connection is established between the DPA 112a and the DPA 112b and a session ID is opened. The data protection agent 1010 is also notified to send I/Os. Metadata of the I/O is received at the DPA 112a (1106). The DPA 112a determines if mirroring is activated (e.g., in a mirroring mode) (1110).

If mirroring is not activated, the DPA 112a will send an acknowledgement to the protection agent 1010 at the host 104' using a SCSI transfer ready command (1140) and the protection agent 1010 will be able to complete sending the I/O to the DPA 112a.

The uncommitted metadata is put in a cache 1040a and the I/O is handled (i.e., sent to a remote DPA 124 and so forth) (1150). For example, the host 104 starts sending an I/O to the storage 108, the protection agent 1010 intercepts the I/O and sends the I/O to the DPA 112a. When the I/O to DPA completes the transfer, the protection agent sends the I/O to storage 108. The uncommitted metadata in the cache 1040a is periodically moved to the persistent DMS 1030.

Figure 19A:
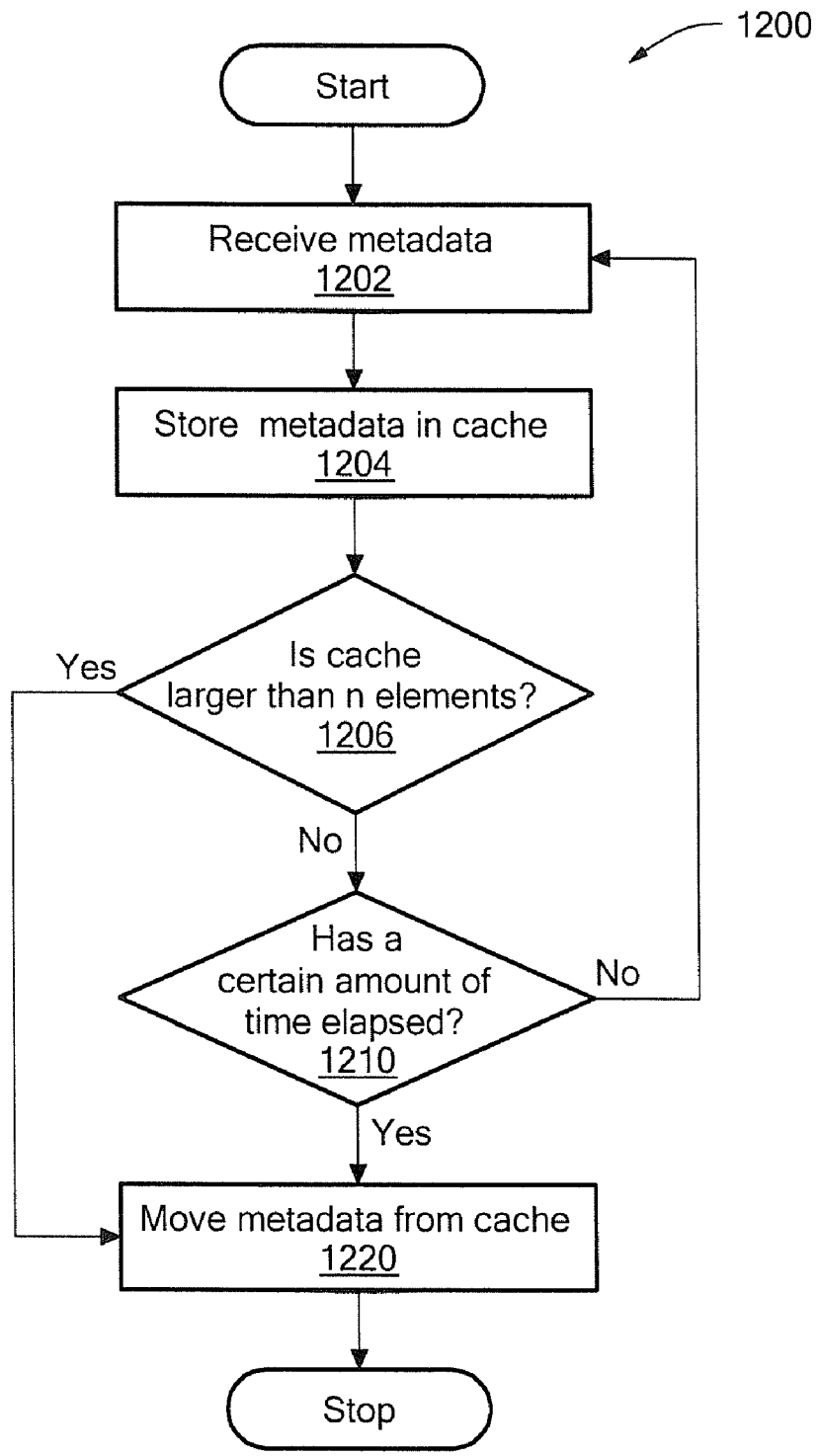
FIGS. 19A and 19B are flow diagrams of examples of processes used with a delta marking stream.
Figure 19B:
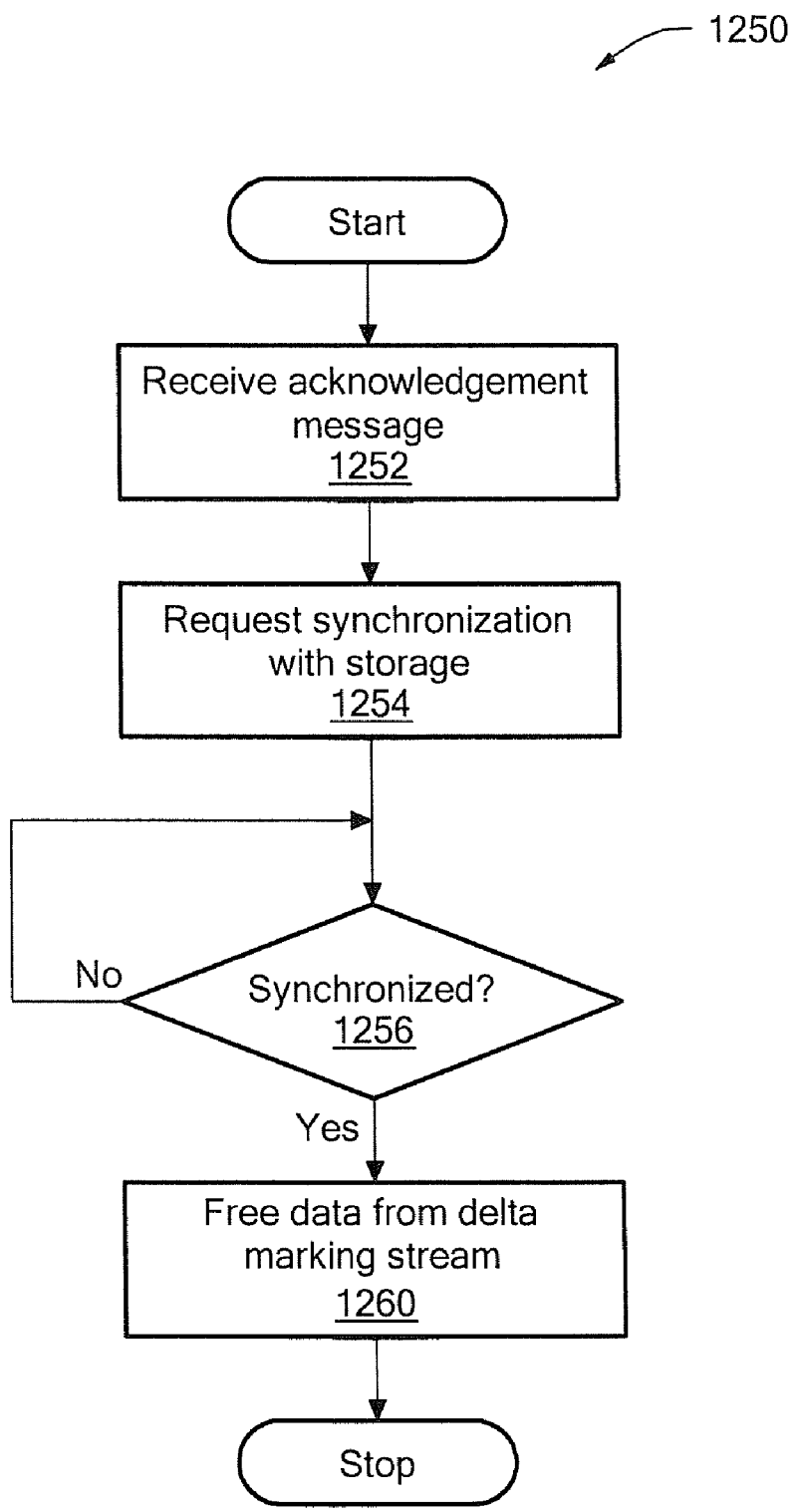

FIGS. 19A and 19B describes examples of processes (e.g., processes 1200 and 1250) used in processing block 1150. The uncommitted metadata is received at the DPA 112a (1202) and stored in its cache 1040a. The DPA 112a determines if the cache 1040a reaches a certain size (n elements) (1206) or a certain time has elapsed (m seconds) (1210) and if either occurs moves the uncommitted metadata to the DMS 1030.

An acknowledgement message is received from the remote DPA 124 that data has moved to the journal up to I/O with metadata ID x (1252). The data protection agent 1010 is requested to synchronize storage (1254). Process 1250 waits for local storage to be synchronized (1256). The synchronization is confirmed when all I/Os currently open from the protection agent 1010 are flushed to local storage. If synchronized, the metadata from delta marking stream until ID x is removed (1260).

Referring back to FIG. 18, the I/Os are sent from the protection agent 1010 to the DPA 112a using a SCSI write command. If mirroring is activated, the metadata received in the CDB of the SCSI write command is sent to the mirror DPA 112b (1120). In one example, the mirroring information is send by a SCSI command descriptor block (CDB).

Process 1100 determines whether the metadata transfer is successful (1130). For example, a SCSI status is received from the DPA 112b at the DPA 112a that the metadata arrived successfully.

If the metadata arrived successfully, the DPA 112a will send an acknowledgement to the protection agent 1010 using a SCSI transfer ready command (1140) and the protection agent 1010 will be able to complete sending the I/O to the DPA 112a (1150).

If the system 1000 is mirroring (e.g., sending uncommitted metadata to the mirror DPA 112b) and the mirroring fails (metadata transfer is not successful as determined by the processing block 1130), there are at least two options depending on the user configuration.

In a first option, if the fragile mode is allowed, the system 1000 will write that it is currently in the fragile mode and will store the state to a persistent storage synchronously (meaning before letting any I/Os continue), then perform processing blocks 1140 and 1150 as described previously. If writing the fragile mode to the persistent storage fails then all open I/Os are failed (1172).

In a second option, if fragile mode is not allowed, then all the arriving I/Os are failed (1164) and the protection agent 1010 will track the failed locations. The DPA 112a will then move the existing uncommitted metadata in cache 1040a to DMS 1030 (1168). In this case the mirror data is no longer needed since all the metadata which arrived to the DPA 112b was moved to a persistent store (1030 DMS). The system 1000 moves to stable mode (1168).

Figure 20:
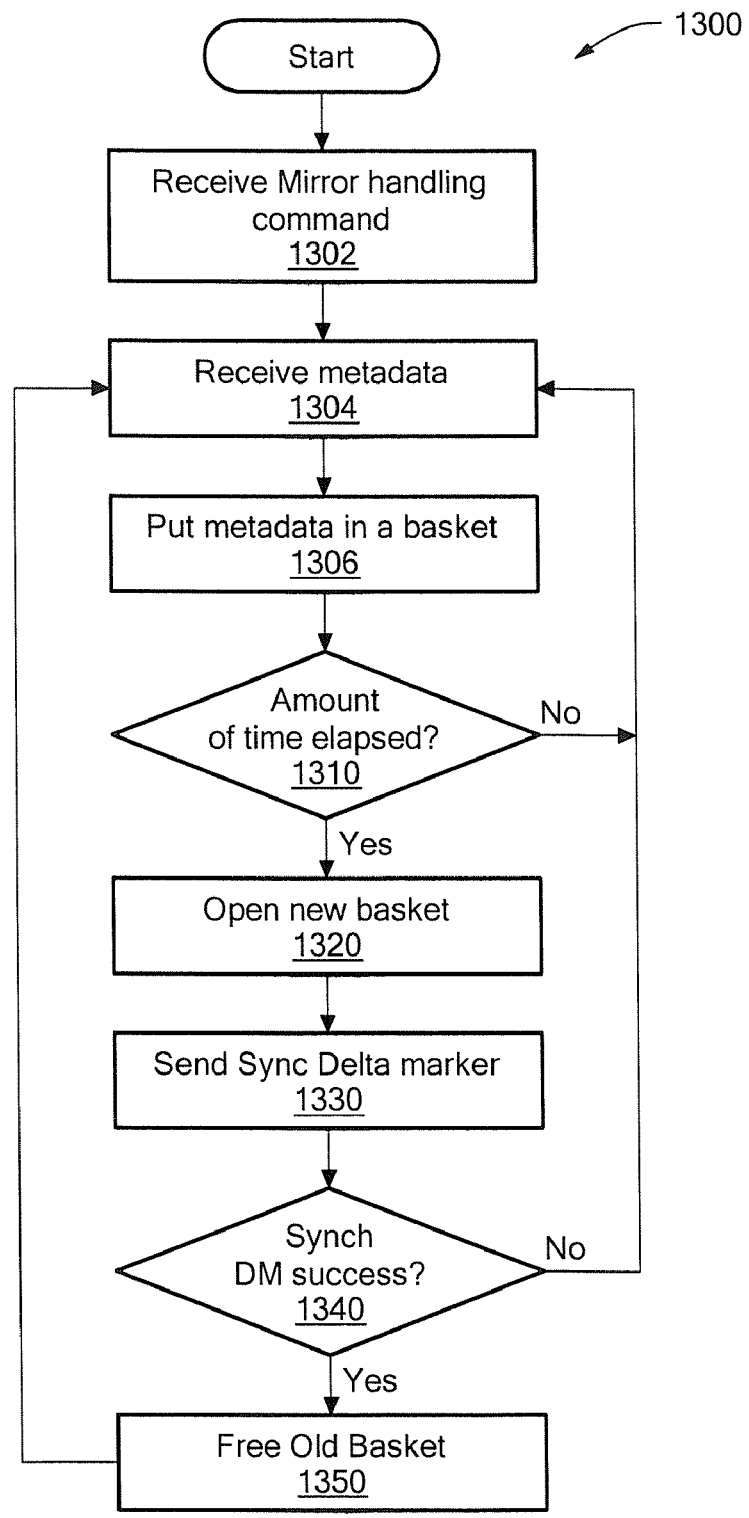

Referring to FIG. 20, an example of a process to handle mirroring metadata is a process 1300. Process 1300 receives a command to perform mirror handling (1302). For example, the DPA 112a receives a request to perform mirror handling. The uncommitted metadata is received at the DPA 112b (1304) and put in a basket (not shown) in the cache 1040b (1306). A basket system is a list of vectors or a list of lists. The current basket is the last vector/list in the list. New metadata is inserted to the end of the last vector/list. A basket is closed by adding another empty vector/list to the end of the list so that new I/Os will enter a new basket.

Process 1300 determines if an amount of time has expired (1310). For example, DPA 112b determines if a specified amount of time (e.g., every 10 seconds) has elapsed using a timer (not shown). In other example, the process 1300 may determine if a specified amount of metadata elements has arrived.

If the amount of time has not elapsed, the DPA 112b continues to receive metadata from the DPA 112a. If the amount of time has elapsed, a new basket is opened (1320) and the I/O of the metadata enters the new vector. The mirror DPA 112b sends a sync delta marker request to the original DPA 112a (1330). When the original DPA 112a gets the sync delta marker request it will make sure all the pending I/Os to the DPA 112a are moved to the DMS 1030 and only then return an acknowledgement message to the mirror DPA 112b. If the acknowledgement message is received indicating that a synch delta marker was a success (1340), the mirror DPA 112b can erase the closed basket in the cache 1040b since all the relevant metadata was already moved to the DMS 1030 (1350).

Figure 21:
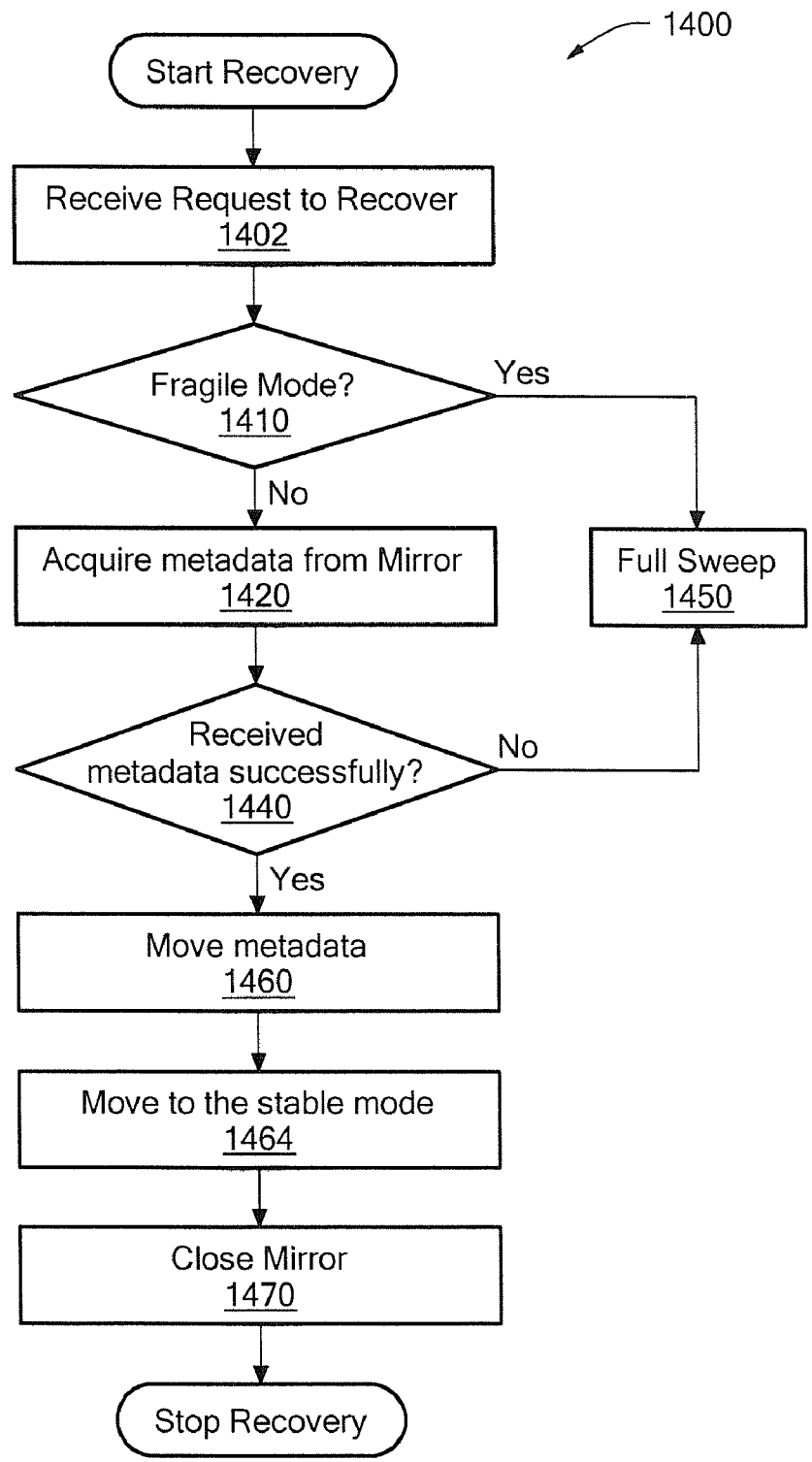
FIG. 21 is a flow diagram of an example of a process to recover mirrored metadata.

Referring to FIG. 21, an example of a process to recover mirrored metadata is a process 1400. The process 1400 is used if the production DPA 112a fails, the replication task will restart at one of the available DPAs (or if DPA 112a recovers it may start on DPA 112a). The process 1400 will return all the metadata which was not moved to the DMS 1030.

A request is received to recover mirrored metadata (1402). For example, the mirroring component 1020 receives a request to recover metadata stored at the cache 1040b. The process 1400 determines if the system 1000 is in the fragile mode (1410). For example, the mirroring component 1020 determines if the system 1000 is in the fragile mode.

If the system 1000 is in the fragile mode, a full-sweep is performed (1450). A full sweep means it is not known which locations are suspected as being different between the source and the target. Thus, at the next initialization, the system 1000 rescans all the data, which is a long process. The full sweep is done by adding all the volumes in a consistency group as dirty from block 0 to the end of the volume, to the DMS 1030.

If the system 1000 is not in the fragile mode, the mirrored metadata is acquired (1420). For example, the mirrored metadata is retrieved from the cache 1040b in the mirror DPA 112b. The process 1400 determines if the metadata has been received successfully (e.g., verifying meta data is also from the correct session) (1440). For example, the mirroring component 1020 determines if the metadata has been received successfully. If the metadata has not been received successfully, a full-sweep is performed (1450). If the metadata has been received successfully, the metadata is moved (1460) (i.e., written to the persistent delta marking stream), the system 1000 moves to the stable mode (1464) and the mirror is closed (1470) so that a new mirror may be established (as described in FIG. 18). The new mirror may be on a different DPA because the new replication process may run on the same DPA (112b) as the old mirroring process, thus the mirror must run on a different DPA.

Figure 22:
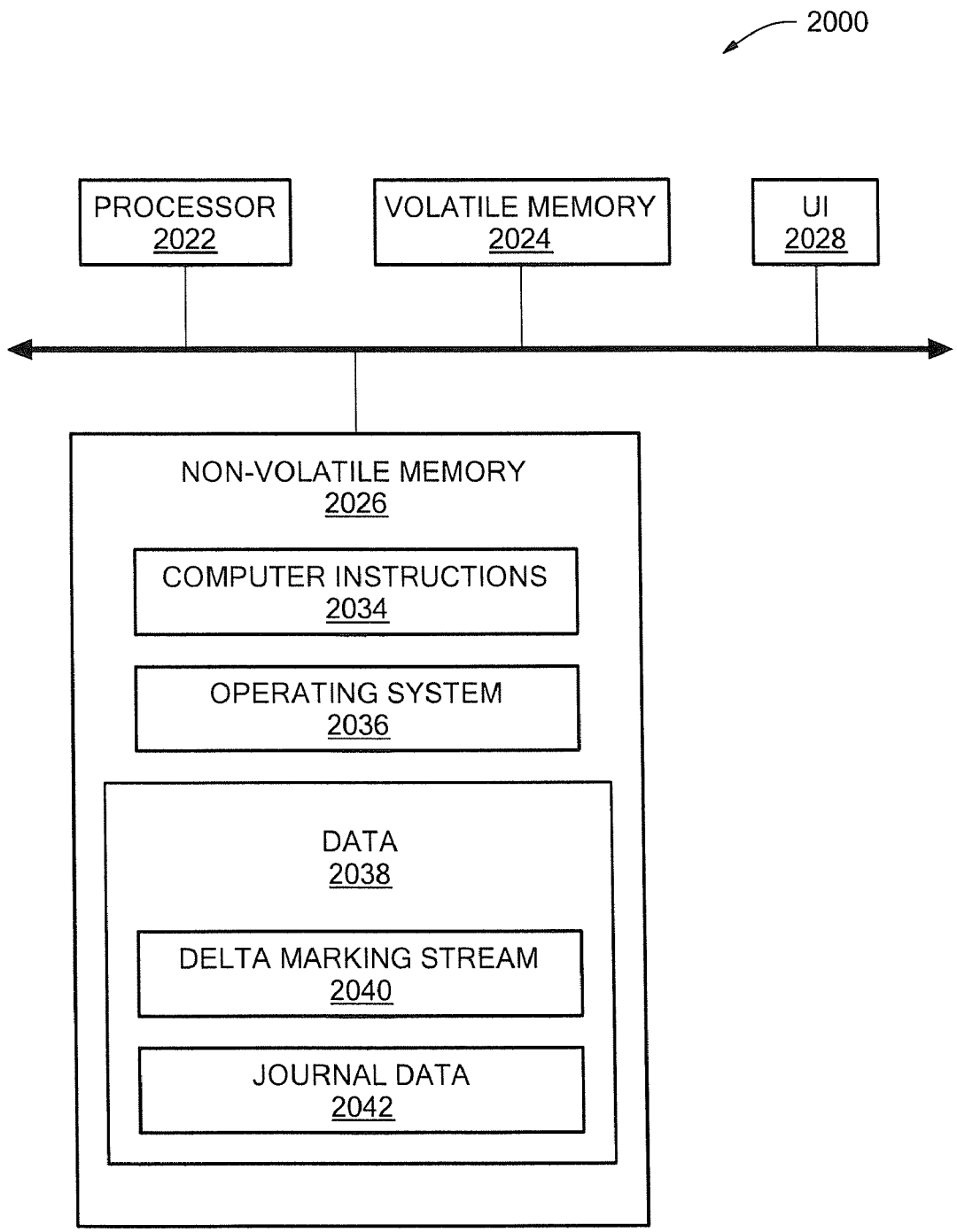
FIG. 22 is a computer on which the processes of FIGS. 18 to 21 may be implemented.

FIG. 22 is an example of a computer 2000, which may be used to execute all or part of the processes 1100, 1200, 1250, 1300 and 1400. Computer 2000 includes a processor 2022, a volatile memory 2024, a non-volatile memory 2026 (e.g., hard disk), for example, and a user interface 2028 (e.g., a mouse, a keyboard, a touch screen and so forth). Non-volatile memory 2026 includes an operating system 2036; data 2038 including a delta marking stream 2040 and journal data 2042 including a DO stream, an UNDO stream, a DO METADATA stream, an UNDO METADATA stream and an initialization stream; and computer instructions 2034 which are executed out of volatile memory 2024 to perform all or part of processes.

The processes described herein (e.g., the processes 1100, 1200, 1250, 1300 and 1400) are not limited to use with the hardware and software of FIG. 22; they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes 1100, 1200, 1250, 1300 and 1400, for example, and to generate output information.

The processes 1100, 1200, 1250, 1300 and 1400 described herein are not limited to the specific embodiments described herein. For example, the processes are not limited to the specific processing order of the process blocks in FIGS. 18 to 21. Rather, any of the process blocks of FIGS. 18 to 21 may be re-ordered, combined or removed, performed in parallel or in serial, as necessary, to achieve the results set forth above.

Process blocks in FIGS. 18 to 21 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

While the invention is shown and described in conjunction with a particular embodiment having an illustrative architecture having certain components in a given order, it is understood that other embodiments well within the scope of the invention are contemplated having more and fewer components, having different types of components, and being coupled in various arrangements. Such embodiments will be readily apparent to one of ordinary skill in the art. All documents cited herein are incorporated herein by reference. Other embodiments not specifically described herein are also within the scope of the following claims.

What is claimed is:

1. A method comprising:
    providing data protection to data in a first volume at a first data protection appliance by storing a copy of the data in a second volume using a second data protection appliance;
    tracking changes between data locations in the first volume and the second volume using a delta marking stream (DMS), the DMS comprising a stream of metadata comprising input/output completed to the first volume which have not yet been applied to a replication journal and input/output applied to the replication journal which have not been completed to the second volume, the replication journal comprising a DO stream, an UNDO stream, a DO metadata stream and an UNDO metadata stream;
    receiving, at the first data protection appliance, metadata not yet committed to the DMS;
    mirroring the metadata at a third data protection appliance in a same cluster as the first data protection appliance, wherein the same cluster comprises the first data protection appliance and the third data protection appliance;
    committing the metadata to the DMS;
    removing the metadata from the third data protection appliance if the metadata is committed to the DMS
    determining if the acquiring of the metadata at the third data protection appliance is successful;
    moving the metadata to the DMS and moving the system to stable mode if acquiring the metadata is successful;
    receiving a request to recover the metadata; and
    performing a full sweep on the first and second volumes if in a fragile mode.

2. The method of claim 1 wherein the second data protection appliance is the first data protection appliance.

3. The method of claim 1 wherein the mirroring comprises storing the metadata at the third data protection appliance until at least one of a predefined amount of time has elapsed or the metadata reaches a predefined size.

4. The method of claim 3, wherein storing the metadata comprises storing the metadata using a basket system.

5. The method of claim 1, further comprising if mirroring fails:
    moving into a fragile mode if the fragile mode is allowed; and
    moving into a stable mode if the fragile mode is not allowed.

6. The method of claim 1, further comprising:
    establishing a connection between the first data protection appliance and the second data protection appliance;
    connecting a protection agent to the first data protection appliance if the connection between the first data protection appliance and the second data protection appliance has been established; and
    sending I/Os from the protection agent to the first data protection appliance.

7. An article comprising:
    a non-transitory machine-readable medium that stores executable instructions to perform mirroring, the instructions causing a machine to:
    provide data protection to data in a first volume at a first data protection appliance by storing a copy of the data in a second volume using a second data protection appliance;
    track changes between data locations in the first volume and the second volume using a delta marking stream (DMS), the DMS comprising a stream of metadata comprising input/output completed to the first volume which have not yet been applied to a replication journal and input/output applied to the replication journal which have not been completed to the second volume, the replication journal comprising a DO stream, an UNDO stream, a DO metadata stream and an UNDO metadata stream;
    receive, at the first data protection appliance, metadata, the metadata intended to be committed to the DMS;
    mirror the metadata at a third data protection appliance in a same cluster as the first data protection appliance, the mirroring comprises storing the initial set of metadata at the third data protection appliance until at least one of a predefined amount of time has elapsed or the initial set of metadata reaches a predefined size;
    commit the metadata to the DMS;
    remove the metadata from the third data protection appliance if the initial set of metadata is committed to the DMS;
    determine if the acquiring of the metadata at the third data protection appliance is successful;
    move the metadata to the DMS and move the system to stable mode if acquiring the metadata is successful;
    receive a request to recover the metadata; and
    perform a full sweep on the first and second volumes if in a fragile mode.

8. The article of claim 7, further comprising instructions causing the machine to:
    receive a request to recover the metadata; and
    perform a full sweep on the first and second volumes if in a fragile mode.

9. An apparatus to perform mirroring, comprising:
circuitry to:
- provide data protection to data in a first volume at a first data protection appliance by storing a copy of the data in a second volume using second data protection appliance;
- track changes between data locations in the first volume and the second volume using a delta marking stream (DMS), the DMS comprising a stream of metadata comprising input/output completed to the first volume which have not yet been applied to a replication journal and input/output applied to the replication journal which have not been completed to the second volume, the replication journal comprising a DO stream, an UNDO stream, a DO metadata stream and an UNDO metadata stream;
- receive, at the first data protection appliance, metadata, the metadata intended to be committed to the DMS;
- mirror the metadata at a third data protection appliance, the mirroring comprises storing the metadata at the third data protection appliance until at least one of a predefined amount of time has elapsed or the initial set of metadata reaches a predefined size;
- commit the metadata to the DMS;
- remove the metadata from the third data protection appliance if metadata is committed to the DMS;
- determine if the acquiring of the metadata at the third data protection appliance is successful;
- move the metadata to the DMS and move the system to stable mode if acquiring the metadata is successful;
- receive a request to recover the metadata; and
- perform a full sweep on the first and second volumes if in a fragile mode.

10. The apparatus of claim 9 wherein the circuitry comprises at least one of a processor, a memory, programmable logic and logic gates.

11. The apparatus of claim 9, further comprising circuitry to:
- receive a request to recover the metadata; and
- perform a full sweep on the first and second volumes if in a fragile mode.

* * * * *